(12) United States Patent
Harada et al.

(10) Patent No.: US 11,388,617 B2
(45) Date of Patent: Jul. 12, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Weiqi Sun, Beijing (CN); Yong Li, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 194 days.

(21) Appl. No.: 16/613,917

(22) PCT Filed: May 16, 2017

(86) PCT No.: PCT/JP2017/018424
§ 371 (c)(1),
(2) Date: Nov. 15, 2019

(87) PCT Pub. No.: WO2018/211607
PCT Pub. Date: Nov. 22, 2018

(65) Prior Publication Data
US 2021/0409988 A1  Dec. 30, 2021

(51) Int. Cl.
*H04W 24/10* (2009.01)
*H04L 5/00* (2006.01)

(52) U.S. Cl.
CPC .......... *H04W 24/10* (2013.01); *H04L 5/0053* (2013.01)

(58) Field of Classification Search
CPC ............................ H04W 24/10; H04L 5/0053
See application file for complete search history.

(56) References Cited

U.S. PATENT DOCUMENTS

| | | | |
|---|---|---|---|
| 2011/0274007 A1 | 11/2011 | Lin et al. | |
| 2011/0281601 A1* | 11/2011 | Ahn | H04L 5/001 |
| 2015/0245235 A1 | 8/2015 | Tang et al. | |
| 2015/0327193 A1* | 11/2015 | Yu | H04W 56/00 |
| 2019/0115962 A1* | 4/2019 | Liu | H04B 7/0848 |
| 2021/0058807 A1* | 2/2021 | Cui | H04W 24/10 |

FOREIGN PATENT DOCUMENTS

| | | |
|---|---|---|
| JP | 2017-503437 A | 1/2017 |
| WO | 2015-133825 A1 | 9/2015 |

OTHER PUBLICATIONS

3GPP TSG-RAN WG4 Meeting #82; R4-1701063 "Per-CC measurement gap configurations" Intel; Athens, Greece; Feb. 13-17, 2017 (10 pages).

Office Action issued in European Application No. 17909759.7; dated Jun. 28, 2021 (8 pages).

(Continued)

*Primary Examiner* — Ronald B Abelson
(74) *Attorney, Agent, or Firm* — Osha Bergman Watanabe & Burton LLP

(57) ABSTRACT

RRM measurement is conducted appropriately. According to one aspect of the present invention, a user terminal has a receiving section that receives information about a measurement gap pattern for use in measurement of a plurality of synchronization signal blocks, and a measurement section that measures the synchronization signal blocks in a measurement gap.

4 Claims, 20 Drawing Sheets

(56) References Cited

OTHER PUBLICATIONS

Office Action in counterpart Japanese Patent Application No. 2019-518651 dated May 25, 2021 (5 pages).
International Search Report issued in PCT/JP2017/018424 dated Aug. 8, 2017 (2 Pages).
Written Opinion of the International Searching Authority issued in PCT/JP2017/018424 dated Aug. 8, 2017 (4 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 8)"; Mar. 2010 (149 Pages).
Extended European Search Report issued in counterpart European Patent Application No. 17909759.7, dated Sep. 21, 2020 (10 pages).
LG Electronics; "Discussion on NR cell identification"; 3GPP TSG-RAN WG4 Meeting #83, R4-1704534; Hangzhou, China; May 15-19, 2017 (5 pages).
Intel Corporation; "On measurement gap for NSA NR"; 3GPP TSG-RAN WG4 Meeting #83, R4-1704714; Hangzhou, China; May 15-19, 2017 (4 pages).
Huawei, HiSilicon; "Discussion on measurement gaps in NR"; 3GPP TSG-RAN WG4 Meeting #83, R4-1705070; Hangzhou, China; May 15-19, 2017 (5 pages).
ZTE, ZTE Microelectronics; "Consideration on the measurement gap"; 3GPP TSG-RAN WG2 Meeting #98, R2-1704644; Hangzhou, China; May 15-19, 2017 (5 pages).
Office Action issued in European Application No. 17909759.7 dated Feb. 2, 2022 (8 pages).

* cited by examiner

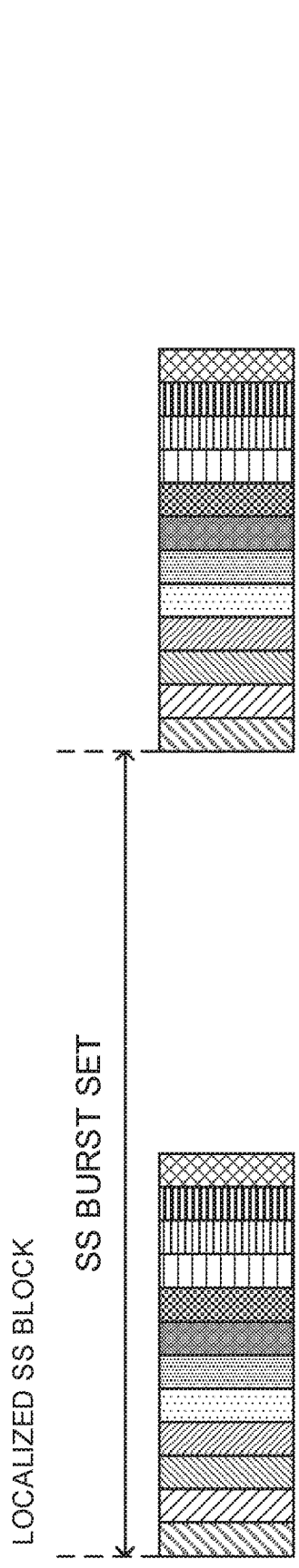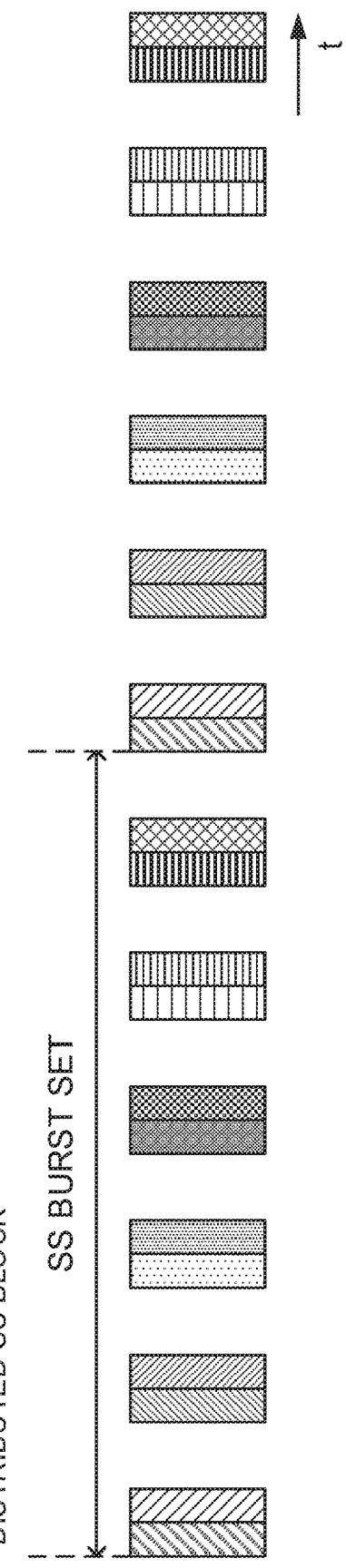
FIG. 4A
FIG. 4B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted to provide wide bands and increased speed beyond LTE (also referred to as "LTE Rel. 8" or "LTE Rel. 9"), and successor systems of LTE (also referred to as, for example, "FRA (Future Radio Access)," "5G (5th Generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. Furthermore, in CA, a plurality of CCs under the same base station (referred to as an "eNB (evolved Node B)," a "BS (Base Station)" and so on) are configured in a user terminal (UE (User Equipment)).

Meanwhile, in LTE Rel. 12, dual connectivity (DC), in which multiple cell groups (CGs) formed under different radio base stations are configured in a UE, is also introduced. Each cell group is comprised of at least 1 cell (CC). Since multiple CCs under different radio base stations are integrated in DC, DC is also referred to as "inter-eNB CA."

Also, in LTE Rel. 8 to 12, frequency division duplex (FDD), in which downlink (DL) transmission and uplink (UL) transmission take place in different frequency bands, and time division duplex (TDD), in which downlink transmission and uplink transmission switch over time and take place in the same frequency band, are introduced.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, 5G/NR is under study to provide various radio communication services, referred to as "eMBB (enhanced Mobile Broad Band)," "mMTC (massive Machine Type Communication)," "URLLC (Ultra Reliable and Low Latency Communications)," and so on.

Now, envisaging NR, the use of RRM (Radio Resource Management) measurement for mobility control is under research. However, how to perform RRM measurement has not been decided yet. If RRM measurement is not properly performed, there may be a decline in communication throughput.

The present invention has been made in view of the above, and it is therefore an object of the present invention to provide a user terminal and a radio communication method, whereby RRM measurement can be configured properly.

Solution to Problem

According to one aspect of the present invention, a user terminal has a receiving section that receives information about a measurement gap pattern for use in measurement of a plurality of synchronization signal blocks, and a measurement section that measures the synchronization signal blocks in a measurement gap.

Advantageous Effects of Invention

According to the present embodiment, it is possible to configure RRM measurement properly.

BRIEF DESCRIPTION OF DRAWINGS

FIGS. 4A and 4B provide diagrams to show examples of SS block patterns;

DESCRIPTION OF EMBODIMENTS

<Measurement Gap>

Figure 1:
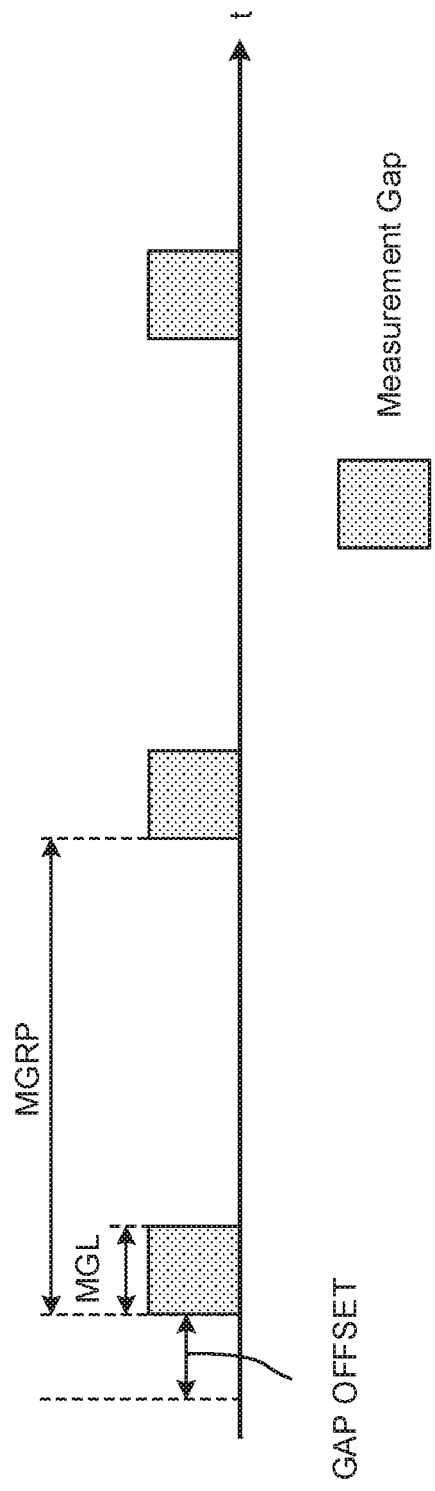
FIGS. 1A and 1B provide diagrams to show examples of MG patterns.

In existing LTE, UE supports inter-frequency measurements, in which measurements are conducted in non-serving carriers apart from connecting serving carriers. Also, in inter-frequency measurements, at least one of the reference signal received power (RSRP), the received signal strength (RSSI (Received Signal Strength Indicator)) and the reference signal received quality (for example, RSRQ) in non-serving carriers is measured.

Here, RSRP is the received power of the desired signal, and is measured by using, for example, CRS. Also, RSSI is the total received power of the received power of the desired signal, plus the power of interference and noise. RSRQ is the ratio of RSRP to RSSI.

In a measurement gap (MG), UE switches the receiving frequency from the serving carrier to a non-serving carrier, and, by measuring at least one of RSRP, RSSI and RSRQ by using, for example, CRS, switches the receiving frequency from the non-serving carrier to the serving carrier. Here, a measurement gap is an interval for making inter-frequency measurements, and, while in this interval, the UE stops transmission and receipt in the communicating carrier and conducts measurements in another frequency carrier.

FIG. 1A is a diagram to show an example of an MG pattern. As shown in FIG. 1A, the UE uses a predetermined time length (also referred to as a "measurement gap length (MGL)"), repeated every predetermined repetition period (also referred to as "measurement gap repetition period (MGRP)"), as an MG. An MG pattern is determined by the MGL and the MGRP. When the UE receives a gap pattern indicator (gap pattern ID) through higher layer signaling (for example, RRC signaling), the UE can identify the MG pattern based on the indicator.

Also, in inter-frequency measurements, gap offsets may be reported by higher layer signaling (for example, RRC signaling). Here, as shown in FIG. 1A, a gap offset is the starting offset from the top of a predetermined radio frame to the beginning of an MG, indicating the timing of the MG. Note that the UE may identify the MG pattern from a gap offset that is reported. In this case, the MG pattern is implicitly reported.

Existing LTE, as shown in FIG. 1B, provides 2 patterns, namely a gap pattern 0, in which the MGL is 6 ms and the MGRP is 40 ms, and a gap pattern 1, in which the MGL is 6 ms and the MGRP is 80 ms. If the MGRP is 40 ms, the gap offset [ms] is reported using an integer between 0 and 39, and, if the MGRP is 80 ms, the gap offset [ms] is reported using an integer between 0 and 79.

The MGL is fixed at 6 ms. The MGL is configured so that the PSS/SSS transmission cycle is 5 ms, and on the assumption that it takes 0.5 ms to switch the frequency from the connecting carrier to the carrier to be measured, and 0.5 ms to switch back the frequency.

In existing LTE systems, 1 MG pattern is configured for 1 UE. If the UE has only 1 RF chain (transmitting/receiving section), the UE conduct measurements by switching between multiple carriers. During the MG, the UE cannot communicate with the connecting carrier.

If the UE is configured to perform inter-frequency measurements for multiple carriers, the measurement cycle for each carrier is the same. For example, the measurement cycle for each carrier is determined by (MGRP)×(the number of carriers subject to inter-frequency measurements).

Figure 2:
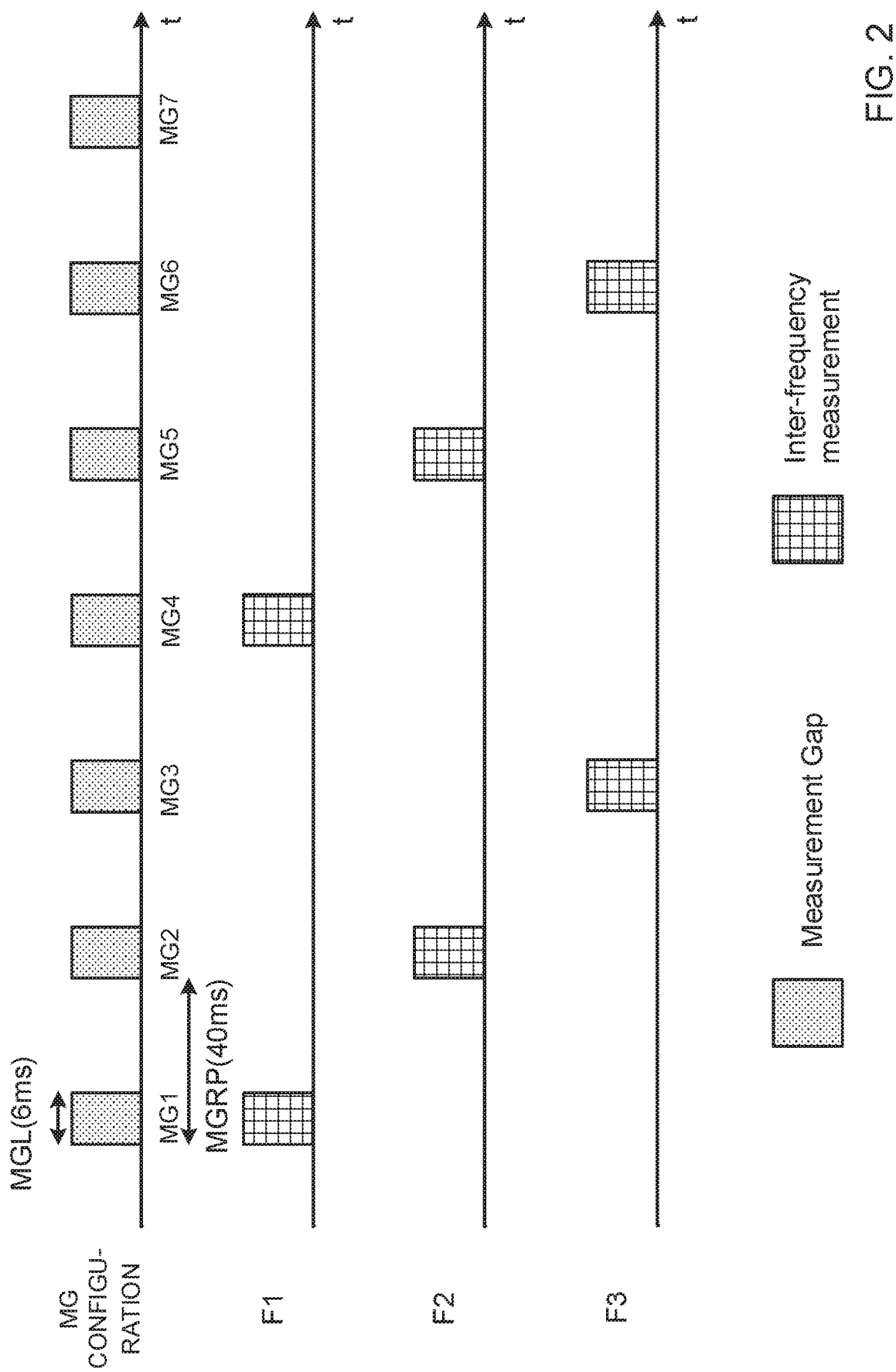
FIG. 2 is a diagram to show examples of inter-frequency measurements.

FIG. 2 is a diagram to show examples of inter-frequency measurements. In this example, 3 non-serving carriers are to be measured and the MGRP is 40 ms, so that the measurement cycle is 120 ms in each carrier. Thus, an existing MG pattern is configured for a number of carriers to be measured, in common, and 1 MG is used for inter-frequency measurement for one of a number of carriers.

<SS Blocks>

Envisaging future radio communication systems (for example, LTE Rel. 14, 15 and later versions, 5G, NR and so forth, hereinafter collectively referred to as "NR"), studies are in progress to define a resource unit that includes synchronization signals and a broadcast channel as an SS block (Synchronization Signal block) and gain initial access based on this SS block.

Figure 3:
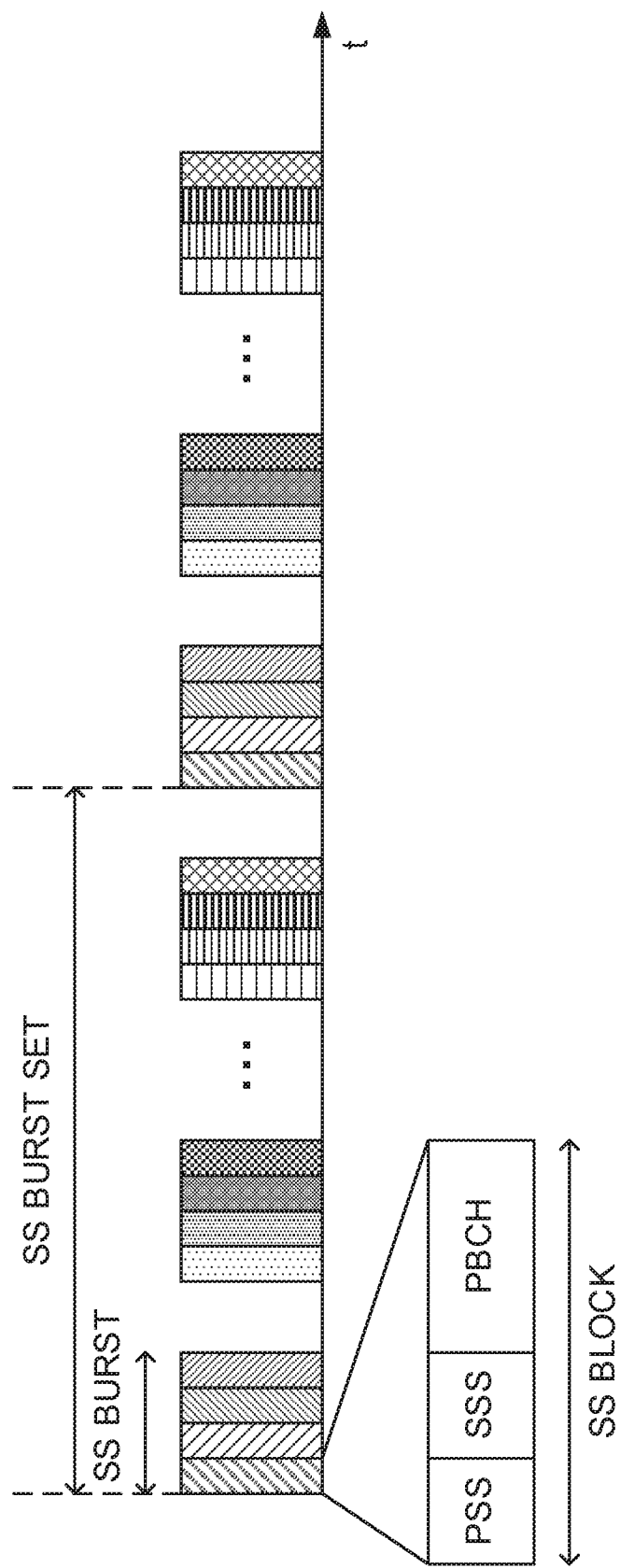
FIG. 3 is a diagram to explain the concept of an SS block.

FIG. 3 is a diagram to explain the concept of an SS block. The SS block shown in FIG. 3 is comprised at least of a PSS for NR (NR-PSS), an SSS for NR (NR-SSS) and a PBCH for NR (NR-PBCH) that can be used for the same use as the PSS, the SSS and the PBCH of existing LTE systems. Note that the SS block may contain a synchronization signal (TSS (Tertiary SS)) apart from the PSS and the SSS.

The length of the SS block is, for example, N OFDM symbols. In this example, a 1-symbol PSS, a 1-symbol SSS, and a 2-symbol PBCH are time-division-multiplexed (TDM). The PSS and the SSS, or the PSS and the PBCH, may be time-division-multiplexed (TDM) or frequency-division-multiplexed (FDM).

A set of one or multiple SS blocks may be referred to as an "SS burst." According to this example, an SS burst is comprised of a plurality of SS blocks that are continuous in time, but this is by no means limiting. For example, an SS burst may be formed with SS blocks of contiguous frequency and/or time resources, or may be formed with SS blocks of non-contiguous frequency and/or time resources.

It is preferable that SS bursts are transmitted in a predetermined cycle (this cycle may be referred to as "SS burst period"). Alternatively, SS bursts may not be transmitted periodically (and may be transmitted aperiodically). As for the length of SS bursts and/or the period of SS bursts, SS bursts may be transmitted in intervals such as one or multiple subframes, one or multiple slots, and so on.

An SS burst may be comprised of L SS blocks. L might vary depending on the range of frequencies. For example, L may be configured to either 1, 2 or 4 when the frequency range is less than 3 GHz, L may be configured to either 4 or 8 when the frequency range is between 3 GHz and 6 GHz, and L may be configured to 64 when the frequency range is between 6 GHz and 52.6 GHz.

Also, one or more SS bursts may be referred to as an "SS burst set (SS burst series)." For example, a base station (which may be referred to as a "BS (Base Station)," a "TRP (Transmission/Reception Point)," an "eNB (eNode B)," a "gNB," etc.)) and/or UE may use one or multiple SS bursts included in 1 SS burst set to apply beam sweeping to a plurality of SS blocks and transmit the SS bursts.

An SS burst set may be comprised of n SS bursts.

Note that SS burst sets are preferably transmitted periodically. The UE may control receiving processes on the assumption that SS burst sets are transmitted periodically (in the SS burst set period). The SS burst set period may be a default value (for example, 20 ms), or may be reported from the NW (the network, represented by, for example, a base station) via higher layer signaling.

Next, SS block patterns (synchronization signal block configurations) to show the allocation of SS blocks in time will be described. For SS block patterns, for example, localized SS blocks (localized allocation) and distributed SS blocks (distributed allocation) may be used.

When localized SS blocks are used, as shown in FIG. 4A, 1 SS burst set contains 1 SS burst. All SS blocks are allocated, in a localized manner, at the beginning of an SS burst set period, and no SS block is allocated in the rest of the period. By this means, SS burst sets are transmitted periodically. Consequently, the rest of the period can be used for other uses, or be suspended.

When distributed SS blocks are used, as shown in FIG. 4, 1 SS burst set contains a number of SS bursts. Multiple SS bursts are distributed and allocated over an SS burst set period, gaps are provided between multiple SS bursts. Each SS burst set is transmitted periodically. Scheduling is limited if SS blocks are transmitted in different beams, so that, when distributed SS blocks are used, the gaps between SS bursts can be used to communicate user data, so that it is possible to prevent user data from being unevenly distributed and communicated in time.

The SS block patterns and/or parameters may vary per frequency (carrier), per cell, and so on. The parameters include, for example, the number of beams for transmitting SS blocks, the number of SS blocks, the period of SS burst sets and the like.

Figure 5A:
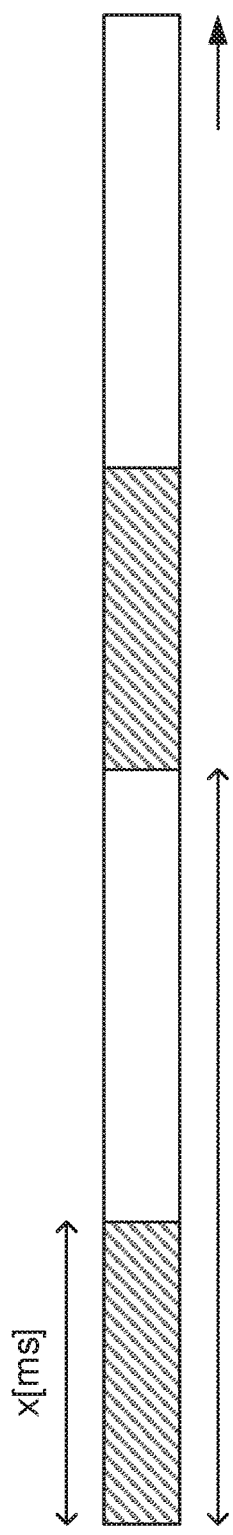
FIGS. 5A to 5C provide diagrams to show examples of SS block pattern parameters.
Figure 5B:
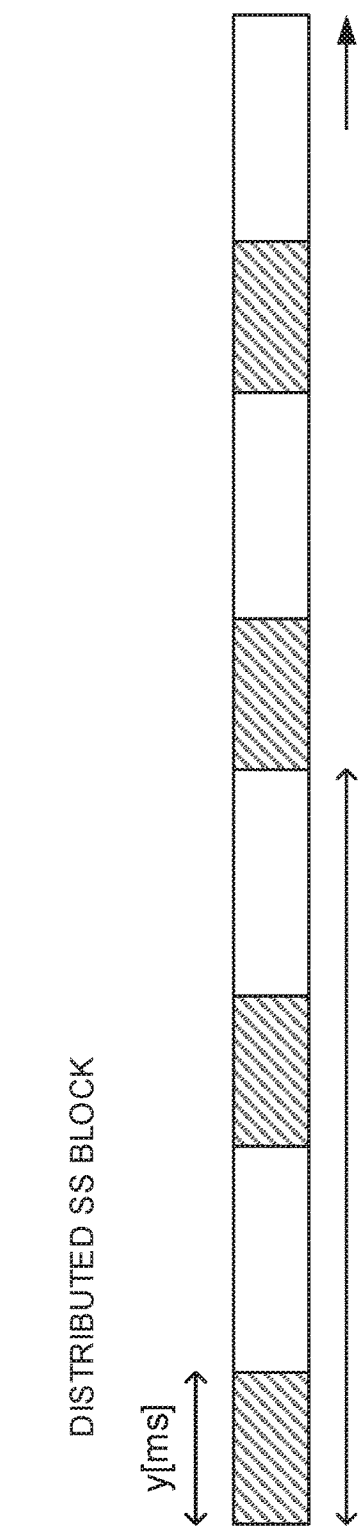
Figure 5C:
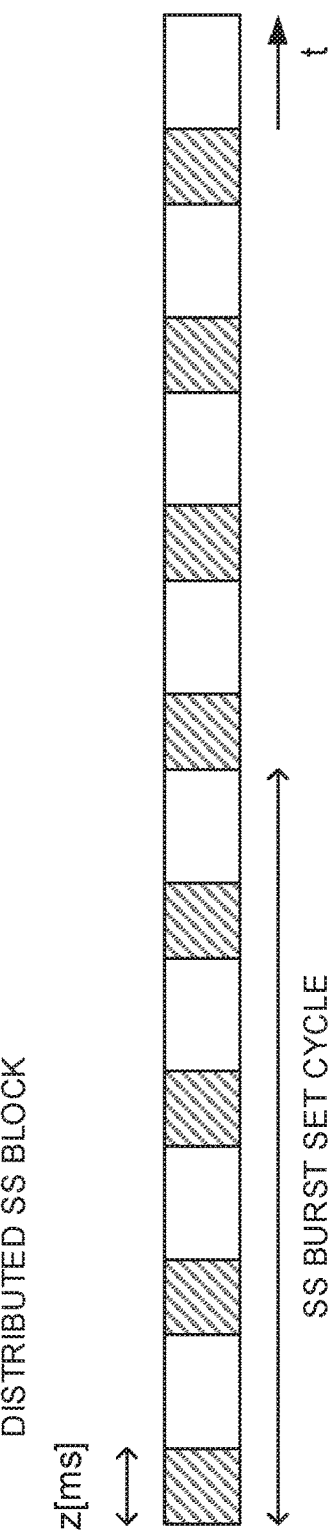

Now, the parameters to constitute SS block patterns will be described. For example, assume that the SS burst length of the localized SS blocks shown in FIG. 5A is x [ms], the SS burst length of the distributed SS blocks shown in FIG. 5B is y [ms], and the SS burst length of the distributed SS blocks shown in FIG. 5C is z [ms]. The SS burst set period in each SS block pattern is assumed to be equal. Time may be defined in units other than ms—including, for example, TTIs, slots, symbols, etc.

The relationship among x, y and z is represented by $x = n1 \times y = n2 \times z$. x, y and z are determined based on the number of SS blocks and subcarrier spacing (SCS). n1 and n2 are the number of SS bursts in an SS burst set. In FIG. 5, n1=2 and n2=4 hold.

Envisaging NR DL, studies are underway to support idle RS-based RRM measurement, which uses an idle RS that is always "ON," in both idle mode and connected mode, for mobility measurement.

This idle RS may be, for example, the NR-SSS, or the DMRS (DeModulation Reference Signal) for the NR-SSS and the PBCH (Physical Broadcast CHannel).

In RRM measurement/reporting, the UE measures, for example, received power (for example, RSRP), and report information about the received power. Note that, in this specification, "measurement/reporting" may be used interchangeably with "measurement and/or reporting."

Assuming that the UE may receive SS blocks in MGs, it may be possible to design MG patterns in consideration of the following points.

Because which beams of which cells the UE can receive is not known in advance, MG patterns should support measurements for all SS blocks in SS burst sets. If different SS blocks are transmitted using different beams, MG patterns should support measurements for all beams.

It is preferable to use different MG patterns that are suitable for different SS block patterns (localized SS blocks and distributed SS blocks). Alternatively, it is preferable to use different MG patterns per frequency, per cell, per SS block pattern, and so on.

In order to shorten the time DL/UL transmission is interrupted at the connecting frequency, it is preferable to make the length of gaps short.

UE operations are preferably low in complexity. For example, it is preferable not to switch the RF frequently.

So, the present inventors have worked on MG configurations that are suitable for SS blocks, and arrived at the present invention.

For example, NR supports RRC signaling for providing different MG configurations per frequency unit. An MG configuration includes an MG pattern and/or MG parameters. MG parameters may include any of the length, the period and the offset of MGs. The frequency unit may be, for example, one of a frequency, a frequency band, a frequency range, a frequency group, and the like. A frequency refers to, for example, a carrier. A frequency band refers to, for example, a number of carriers, carriers subject to CA, and the like. A frequency range is, for example, a frequency range less than 3 GHz, a frequency range of 3 GHz to 6 GHz, a frequency range of 6 GHz to 52.6 GHz, and so on. A frequency group is, for example, a number of carriers that are non-contiguous with each other.

By providing MG configurations on a per frequency basis, it is possible to design MG configurations in a flexible manner. Also, by increasing the granularity of frequencies to associate with MG configurations, the overhead of signaling can be reduced.

Also, where there is a synchronous network on 1 frequency, MG configurations that are suitable for SS block patterns are provided. Also, where there is an asynchronous network on 1 frequency, MG configurations that are different from the MG configurations for a synchronous network are provided. UE can perform RRM measurements using beam sweeping, by using MG configurations that are suitable for SS block patterns.

Note that a "beam" as used herein may be interpreted as meaning a "resource," a "space resource," an "antenna port" and the like.

Now, embodiments of the present invention will be described in detail below with reference to the accompanying drawings. Note that the radio communication methods according to the herein-contained embodiments may be used individually or may be used in combination.

(Radio Communication Method)

First Embodiment

According to the first embodiment of the present invention, the NW reports varying MG configurations to UE, per frequency unit, via RRC signaling.

Figure 6:
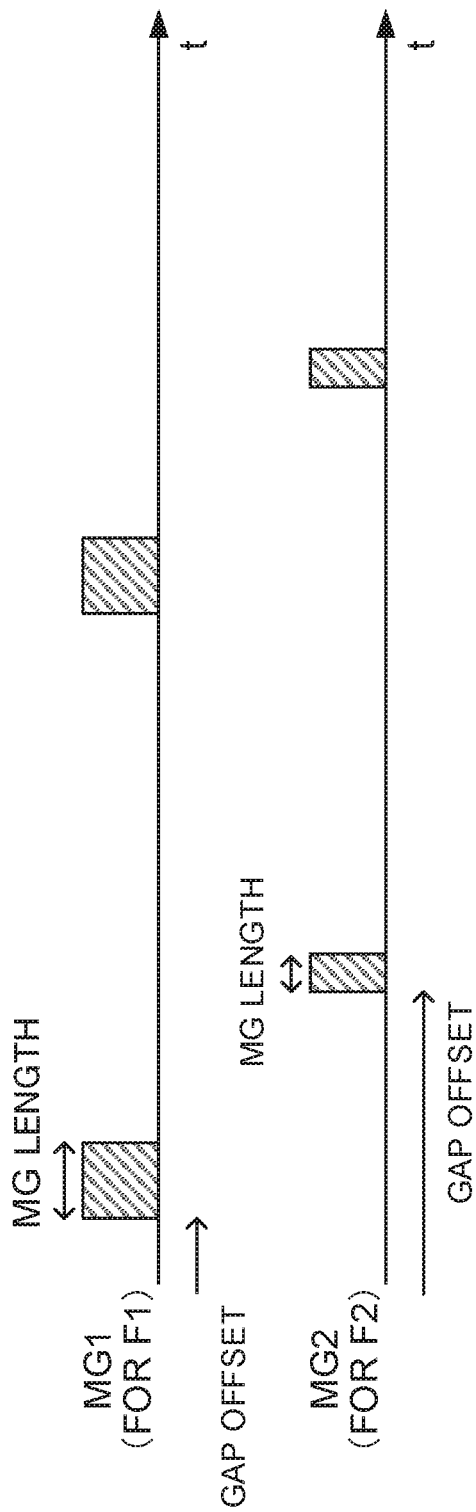
FIG. 6 is a diagram to show examples of MG configurations per frequency band.

FIG. 6 is a diagram to show examples of MG configurations per frequency band. The NW applies different MG configurations MG 1 and MG 2 to 2 frequency bands F1 and F2 for 1 UE. In this example, between the 2 MG configurations, the period of MGs is the same, but the MGs' length and offset are different.

By providing MG configurations per frequency band, the overhead of signaling can be reduced compared to the case where MG configurations are provided per frequency. Also, the overhead of signaling can be reduced by sharing some MG parameters in multiple MG configurations.

Second Embodiment

According to a second embodiment of the present invention, an MG pattern to have 1 MG in 1 MGRP (single-MG pattern), as in existing LTE, and MG parameters that are suitable for localized SS blocks are configured.

MG parameters include one of the length of MGs (MGL), the period of MGs (MGRP), and the offset of MGs (gap offset). The NW, for example, reports MG parameters to UE, via RRC signaling.

The MGL is, for example, the length of the interval of localized SS blocks+X [ms]. This interval of localized SS blocks refers to an interval comprised of a number of contiguous SS blocks (SS bursts). The length of the localized SS block interval may assume, for example, the maximum value for the length of the localized SS block interval at the frequency of the default numerology or the numerology frequency with the minimum SCS. X depends on numerology. For example, X is 1 [ms] when the SCS is 15 kHz. Time may be defined in units other than ms—including, for example, TTIs, slots, symbols, etc.

The length of the localized SS block interval may be determined by UE based on parameters such as the number of SS blocks, SCS and so on, may be reported from the NW, or may be determined based on the specification. X may be determined by the UE based on parameters such as SCS, may be reported from the NW, or may be determined based on the specification. The MGL may be determined by the UE based on parameters such as the length of the interval of localized SS blocks, X and so on, may be reported from the NW, or may be determined based on the specification.

The MGRP may be an integral (k, where k=1, 2, 3 . . . ) multiple of the period of SS burst sets P (20 ms)—that is, the MGRP may be k×P [ms]. The gap offset is, for example, a smaller value than the MGRP, and may be integer value (0 to k×P−1) [ms].

Figure 7:
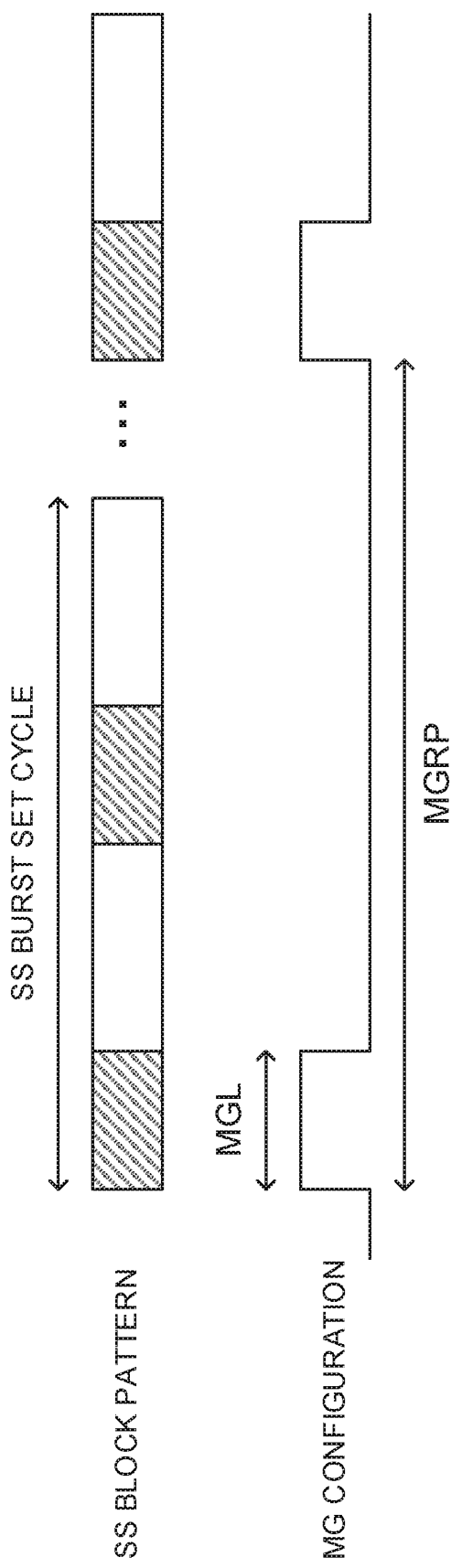
FIG. 7 is a diagram to show examples of MG configurations according to a second embodiment of the present invention.

FIG. 7 is a diagram to show an example of MG configuration according to the second embodiment. This drawing shows an SS block pattern and an MG configuration.

1 MG includes 1 SS burst. This SS burst contains all the SS blocks in an SS burst set, so that UE can measure all the SS blocks in the SS burst set by measuring 1 MG. Note that the UE does not need to measure all the SS burst sets, and may measure 1 SS burst set per k contiguous SS burst sets.

Since 1 MG is configured in an MGRP, the UE can reduce the number of times to switch frequency. When the interval of localized SS blocks is longer, the time communication is interrupted also becomes longer, so that the present embodiment is suitable when the interval of localized SS blocks is short.

Third Embodiment

With a third embodiment of the present invention, an MG pattern (non-contiguous MG pattern), in which multiple non-contiguous gaps (sub-MG events or sub-MGs) are provided in 1 period of the MG pattern, is configured as an MG configuration that is suitable for localized SS blocks. Different gaps include periods of different SS blocks.

Now, 2 methods of configuring non-contiguous MG patterns will be described below. The first configuration method provides 1 MG configuration that includes multiple sub-MG events. The second configuration method provides multiple MG configurations, each showing sub-MGs.

The number of SS burst sets in 1 non-contiguous MG pattern's period is k (k=1, 2 . . . ), and the number of gaps (sub-MG events or sub-MGs) in 1 non-contiguous MG pattern's period is m (m=2, 3 . . . ).

Figure 8:
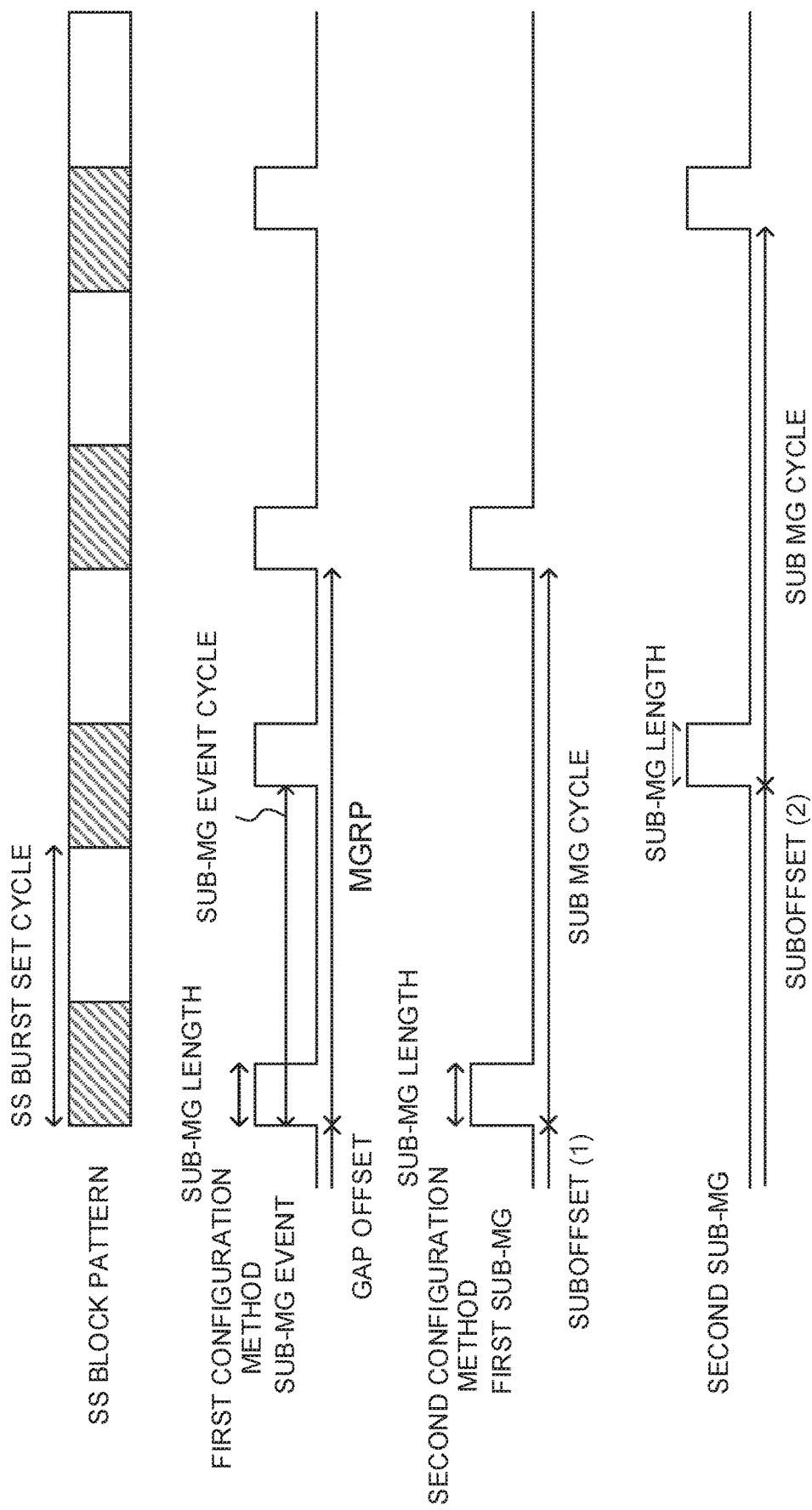
FIG. 8 is a diagram to show examples of non-contiguous MG patterns according to a third embodiment of the present invention.

FIG. 8 is a diagram to show examples of non-contiguous MG patterns according to the third embodiment. Here, k=1 and m=2 hold. This drawing shows an SS block pattern, sub-MG events configured based on the first configuration method, and multiple sub-MGs configured based on the second configuration method (first sub-MG, second sub-MG, etc.).

In the first configuration method, for an MG configuration, the NW configures m sub-MG events in 1 MGRP, in UE, via RRC signaling. An MG configuration is represented by, for example, MGRP, gap offset, sub-MG length, sub-MG event period and so on. MGRP represents the period of a non-contiguous MG pattern. The gap offset is the offset of the non-contiguous MG pattern. The sub-MG length is the length of sub-MG events. The sub-MG event period represents the period of sub-MG events.

MGRP is, for example, an integral multiple (k×m×P) of the SS burst set period P. The gap offset, for example, is a smaller value than MGRP.

The sub-MG length is, for example, 1/m×the length of the localized SS block interval+X. The sub-MG event period is, for example, 1/m×the length of the localized SS block interval+P.

In the first configuration method shown in FIG. 8, m=2 holds, so that 2 sub-MG events (first sub-MG event and second sub-MG event) are configured in 1 MGRP.

Given that the sub-MG event period is longer than the SS burst set period P by ½ of the length of the localized SS block interval, every sub-MG event assumes a different location with respect to the localized SS block interval. In other words, the gap between sub-MG events varies. By this means, the first sub-MG event includes the first half of the localized SS block interval, and the second sub-MG event includes the second half of the localized SS block interval.

The UE can measure all the SS blocks in an SS burst set by measuring all the sub-MG events in 1 MGRP. In this case, the UE may report the result of comparing the measurement results of all sub-MG events in 1 MGRP.

In the second configuration method, for an MG configuration, the NW configures m sub-MGs having varying sub-offsets, in the UE, by way of RRC signaling. The MG configuration is represented by, for example, sub-MG length, a sub-MG period and n sub-offsets. The sub-MG length is the length of sub-MGs. The sub-MG period represents the period of sub-MGs. In multiple sub-MGs, the sub-MG length and the sub-MG period are common. The sub-offsets refer to sub-MG-specific offsets.

The sub-MG period is, for example, an integral multiple (k×m×P) of the SS burst set period P. The sub-MG period may be MGRP. The sub-MG length is, for example, 1/m the length of the localized SS block interval+X.

The i-th sub-offset is given by, for example, sub-offset (i)=sub-offset (i−1)+1/m×the length of the localized SS block interval+P. The number of multiple sub-offsets may indicate the number of sub-MGs implicitly. Alternatively, the UE may select multiple sub-offsets based on the number of sub-MGs, the length of the localized SS block interval and P. Sub-offset (1) is, for example, a value smaller than the sub-MG period.

In the second configuration method shown in FIG. 8, m=2 holds, so that 2 sub-MGs (first sub-MG and second sub-MG) are configured.

Sub-offset (2)–sub-offset (1) is longer than the SS burst set period P by ½×P, so that every sub-MG event assumes a different location with respect to the localized SS block interval. In other words, the gap between adjacent sub-MGs varies.

By this means, the first sub-MG includes the first half of the localized SS block interval, and the second sub-MG includes the second half of the localized SS block interval. By this means, the same non-contiguous MG pattern is configured as in the first configuration method.

When the UE measures the sub-MGs, the UE can measure all the SS blocks in an SS burst set by switching from 1 sub-MG to another and measuring every sub-MG once. In this case, the UE may report the result of comparing the measurement results of all sub-MGs.

If k=1 holds as in this drawing, the UE measures contiguous SS burst sets, but intervals may be provided between measurements by setting k to 2 or more.

According to the present embodiment, the length of 1 gap can be made short compared to the second embodiment. Consequently, even when the connecting frequency is disconnected, the resulting impact of delay in communication can still be reduced. Also, the present embodiment can configure sub-MGs that are shorter than the localized SS block interval, and therefore is suitable when the localized SS block interval is long.

Also, the number m for dividing the localized SS block interval is configurable, so that the length of 1 gap can be flexibly adjusted flexibly.

Fourth Embodiment

According to a fourth embodiment of the present invention, an MG pattern to have 1 MG in 1 MGRP (single-MG pattern), as in existing LTE, and MG parameters that are suitable for distributed SS blocks are configured.

The MGL is, for example, the length of the interval of distributed SS blocks+X [ms]. The distributed SS block interval is the interval from the first SS block to the last SS block in an SS burst set.

The length of the distributed SS block interval may be determined by UE based on parameters such as the number of SS blocks, SCS and so on, may be reported from the NW, or may be determined based on the specification. X may be determined by the UE based on parameters such as SCS, may be reported from the NW, or may be determined based on the specification. The MGL may be determined by the UE based on parameters such as the length of the interval of distributed SS blocks, X, and so on, may be reported from the NW, or may be determined based on the specification.

The MGRP may be an integral (k, where k=1, 2, 3 . . . ) multiple of the period of SS burst sets P (20 ms)—that is, the MGRP may be k×P [ms]. The gap offset is, for example, a smaller value than the MGRP, and may be integer value (0 to k×P−1) [ms]. MGRP and/or gap offsets may be configured from NW to UE.

Figure 9:
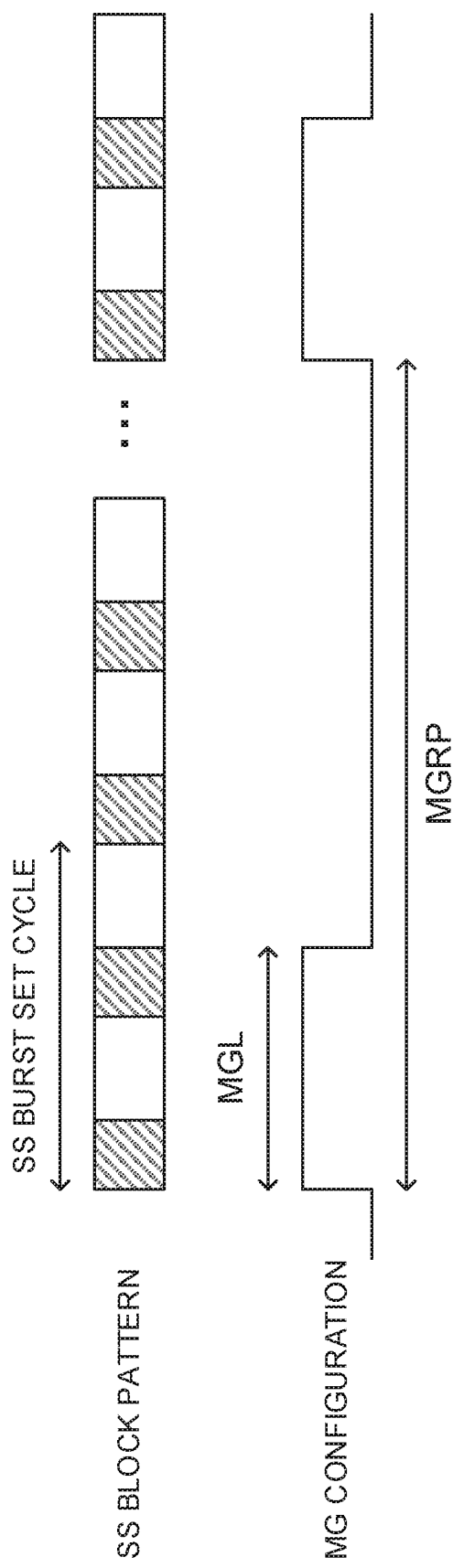
FIG. 9 is a diagram to show examples of MG configurations according to a fourth embodiment of the present invention.

FIG. 9 is a diagram to show an example of MG configuration according to a fourth embodiment. This drawing shows an SS block pattern and an MG configuration.

1 MG includes all the SS bursts in 1 SS burst set. The UE can measure all the SS blocks in an SS burst set by measuring 1 MG. Note that the UE does not need to measure all the SS burst sets, and may measure 1 SS burst set per k contiguous SS burst sets.

Since 1 MG is configured in an MGRP, the UE can reduce the number of times to switch frequency. Since an MG includes parts without SS blocks, the second embodiment has better spectral efficiency than the present embodiment. When the interval of distributed SS blocks is longer, the time communication is interrupted also becomes longer, so that the present embodiment is suitable when the interval of distributed SS blocks is short.

Fifth Embodiment

With a fifth embodiment of the present invention, an MG pattern (non-contiguous MG pattern), in which multiple non-contiguous gaps (sub-MG events or sub-MGs) are provided in 1 period of the MG pattern, is configured as an MG configuration that is suitable for distributed SS blocks. In this non-contiguous MG pattern, multiple gaps in 1 SS burst set period cover all the SS blocks, and its period is an integral multiple of the SS burst set period.

Now, 2 methods of configuring non-contiguous MG patterns will be described below. The first configuration method provides 1 MG configuration that includes multiple sub-MG events. The second configuration method provides multiple MG configurations, each showing sub-MGs.

The number of SS burst sets in 1 non-contiguous MG pattern's period is k (k=1, 2 . . . ), and the number of SS bursts in 1 SS burst set is n (n=2, 3 . . . ).

Figure 10:
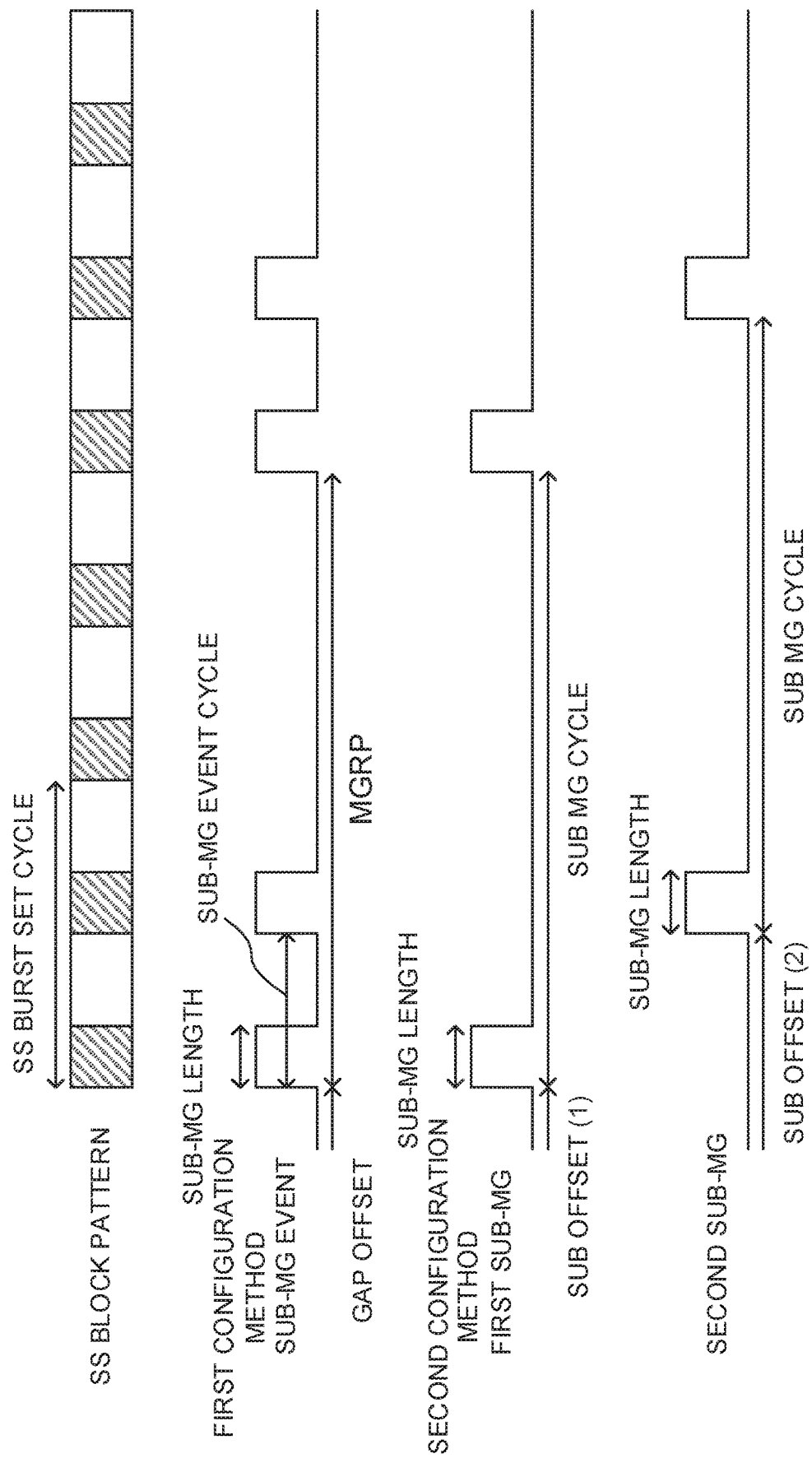
FIG. 10 is a diagram to show examples of non-contiguous MG patterns according to a fifth embodiment of the present invention.

FIG. 10 is a diagram to show examples of non-contiguous MG patterns according to a fifth embodiment of the present invention. Here, k=1 and n=2 hold. This drawing shows an SS block pattern, sub-MG events configured based on the first configuration method, and multiple sub-MGs configured based on the second configuration method (first sub-MG, second sub-MG, etc.).

In the first configuration method, for an MG configuration, the NW configures n sub-MG events in 1 MGRP, in UE, via RRC signaling. An MG configuration is represented by, for example, MGRP, gap offset, sub-MG length, sub-MG event period and so on.

MGRP is, for example, an integral multiple (k×n×P) of the SS burst set period P. The gap offset, for example, is a smaller value than MGRP.

The sub-MG length is, for example, the SS burst length+X. The sub-MG event period is, for example, 1/n×P.

In the first configuration method shown in FIG. 10, n=2 holds, so that 1 SS burst set includes 2 SS bursts (first SS burst and second SS burst), and 2 sub-MG events (first sub-MG and second sub-MG) are configured in 1 SS burst set of 1 MGRP. The first sub-MG event includes the first SS burst, and the second sub-MG event includes a second SS burst. In other words, the gap between sub-MG events varies.

The UE can measure all the SS blocks in an SS burst set by measuring all the sub-MG events in 1 MGRP. In this case, the UE may report the result of comparing the measurement results of all sub-MG events in 1 MGRP.

In the second configuration method, the NW configures n sub-MGs with different sub-offsets to the UE via RRC signaling. The MG configuration is represented by, for example, a sub-MG length, a sub-MG period and n sub-offsets. The sub-MG length and the sub-MG period are common between n sub-MGs.

The sub-MG period is, for example, an integral multiple (k×n×P) of the SS burst set period P. The sub-MG period may be MGRP. The sub-MG length is, for example, the SS burst length+X.

The i-th sub-offset is given by, for example, sub-offset (i)=sub-offset (i−1)+1/n×P. The number of multiple sub-offsets may indicate the number of sub-MGs implicitly. Alternatively, the UE may select multiple sub-offsets based on the number of sub-MGs and P. Sub-offset (1) is, for example, a value smaller than the sub-MG period.

In the second configuration method shown in FIG. 10, n=2 holds, so that 1 SS burst set includes 2 SS bursts (first SS burst and second SS burst), and 2 sub-MGs (first sub-MG and second sub-MG) are configured.

Given that sub-offset (2)−sub-offset (1) gives ½×SS burst set period P, and the first sub-MG includes the first SS burst, and the second sub-MG includes the second SS burst. That is, different sub-MGs include different SS bursts. In other words, the gap between adjacent sub-MGs varies. By this means, the same non-contiguous MG pattern is configured as in the first configuration method.

When the UE measures the sub-MGs, the UE can measure all the SS blocks in an SS burst set by switching from 1 sub-MG to another and measuring every sub-MG once. In this case, the UE may report the result of comparing the measurement results of all sub-MGs.

According to the present embodiment, the length of 1 gap (sub-MG event or sub-MG) can be made short compared to the fourth embodiment. Consequently, even when the connecting frequency is disconnected, the resulting impact of delay in communication can still be reduced. Also, the present embodiment can configure sub-MGs that are shorter than the distributed SS block interval, and therefore is suitable when the distributed SS block interval is long.

Meanwhile, with the present embodiment, the frequency is switched more frequently than the fourth embodiment, so that in the fourth embodiment, the UE operation can be simplified compared to the present embodiment.

Sixth Embodiment

With a sixth embodiment of the present invention, an MG pattern (non-contiguous MG pattern), in which multiple non-contiguous gaps (sub-MG events or sub-MGs) are provided in 1 period of the MG pattern, is configured as an MG configuration that is suitable for distributed SS blocks. In this non-contiguous MG pattern, multiple gaps that span multiple SS burst set periods cover all the SS blocks in an SS burst set, and its period is an integral multiple of the SS burst set period. In other words, the UE measures part of the SS blocks in an SS burst set in 1 SS burst set period, and measures other SS blocks in another SS burst set period.

Now, 2 methods of configuring non-contiguous MG patterns will be described below. The first configuration method provides 1 MG configuration that includes multiple sub-MG events. The second configuration method provides multiple MG configurations, each showing sub-MGs.

The number of SS burst sets in 1 non-contiguous MG pattern's period is k (k=1, 2 . . . ), and the number of SS bursts in 1 SS burst set is n (n=2, 3 . . . ).

Figure 11:
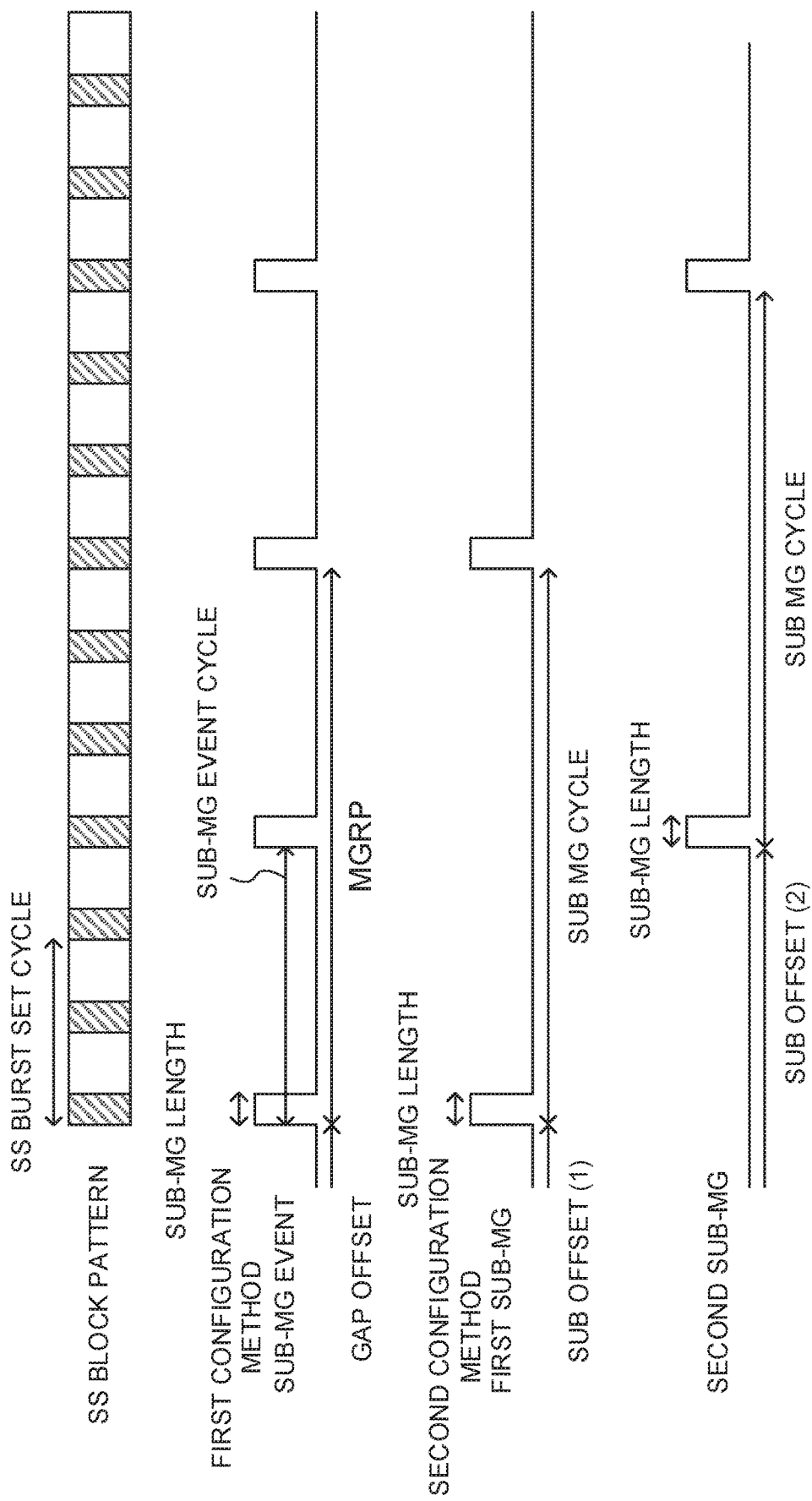
FIG. 11 is a diagram to show examples of non-contiguous MG patterns according to a sixth embodiment of the present invention.

FIG. 11 is a diagram to show examples of non-contiguous MG patterns according to the sixth embodiment. Here, k=1 and n=2 hold. This drawing shows an SS block pattern, sub-MG events configured based on the first configuration method, and multiple sub-MGs configured based on the second configuration method (first sub-MG, second sub-MG, etc.).

In the first configuration method, the NW configures n sub-MG events in 1 MGRP, in UE, via RRC signaling.

MGRP is, for example, an integral multiple (n+1)×k×P of the SS burst set period P. The gap offset, for example, is a smaller value than MGRP.

The sub-MG length is, for example, the SS burst length+X. The sub-MG event period is, for example, 1/n×P+k×P.

In the first configuration method shown in FIG. 11, n=2 holds, so that 1 SS burst set includes 2 SS bursts (first SS burst and second SS burst), and 2 sub-MGs (first sub-MG and second sub-MG) are configured. Since (n+1)×k=3, MGRP is 3 times the SS burst set period P. Consequently, 2 sub-MG events (first sub-MG event and second sub-MG event) are configured in 3 SS burst sets in 1 MGRP (first SS burst set, second SS burst set and third SS burst set).

Given that the sub-MG event period is 3/2 times the SS burst set period P, the first sub-MG event includes the first SS burst in the first SS burst set and, the second sub-MG event includes the second SS burst in the second SS burst set. No sub-MG event is configured in the third SS burst set. That is, different sub-MGs include different SS bursts.

The UE can measure all the SS blocks in an SS burst set by measuring all the sub-MG events in 1 MGRP. In this case, the UE may report the result of comparing the measurement results of all sub-MG events in 1 MGRP.

In the second configuration method, the NW configures n sub-MGs with different sub-offsets to the UE via RRC signaling. The MG configuration is represented by, for example, a sub-MG length, a sub-MG period, and n sub-offsets. The sub-MG length and the sub-MG period are common to the n sub-MGs.

The sub-MG period is, for example, an integral multiple ((n+1)×k−P) of the SS burst set period P. The sub-MG period may be MGRP. The sub-MG length is, for example, the SS burst length+X.

The i-th sub-offset is given by, for example, sub-offset (i)=sub-offset (i−1)+1/n×P+k×P. The number of multiple sub-offsets may implicitly indicate the number of sub-MGs. Alternatively, the UE may select multiple sub-offsets based on the number of sub-MGs and P. Sub-offset (1) is, for example, a value smaller than the sub-MG period.

In the second configuration method shown in FIG. 11, n=2 holds, so that 1 SS burst set includes 2 SS bursts (first SS burst and second SS burst), and 2 sub-MGs (first sub-MG and second sub-MG) are configured. Since (n+1)×k=3, the sub-MG period is 3 times the SS burst set period P. Consequently, 3 SS burst sets (first SS burst set, second SS burst set and third SS burst set) are included in 1 sub-MG period.

Given that sub-offset (2)−sub-offset (1) gives 3/2×SS burst set period P and the gap between the transmission timing of the first SS burst and the transmission timing of the second SS burst is ½×SS burst set period P, the first sub-MG includes the first SS burst in the first SS burst set, and the second sub-MG includes the second SS burst in the second SS burst set. No sub-MG event is configured in the third SS burst set. That is, different sub-MGs include different SS bursts. By this means, the same non-contiguous MG pattern is configured as in the first configuration method.

When the UE measures the sub-MGs, the UE can measure all the SS blocks in an SS burst set by switching from 1 sub-MG to another and measuring every sub-MG once. In this case, the UE may report the result of comparing the measurement results of all sub-MGs.

According to the present embodiment, the length of 1 gap (sub-MG event or sub-MG) can be made short compared to the fourth embodiment. Consequently, even when the connecting frequency is disconnected, the resulting impact of delay in communication can still be reduced. Also, the present embodiment can configure gaps that are shorter than the distributed SS block interval, and therefore is suitable when the distributed SS block interval is long.

Meanwhile, with the present embodiment, the frequency is switched more frequently than the fourth embodiment, so that, in the fourth embodiment, the UE operation can be simplified compared to the present embodiment.

Seventh Embodiment

In a seventh embodiment of the present invention, the NW configures an MG pattern (second embodiment, and fourth embodiment) for a given frequency unit, and configures a non-contiguous MG pattern (third embodiment, fifth embodiment, and sixth embodiment) for another frequency unit.

Figure 12:
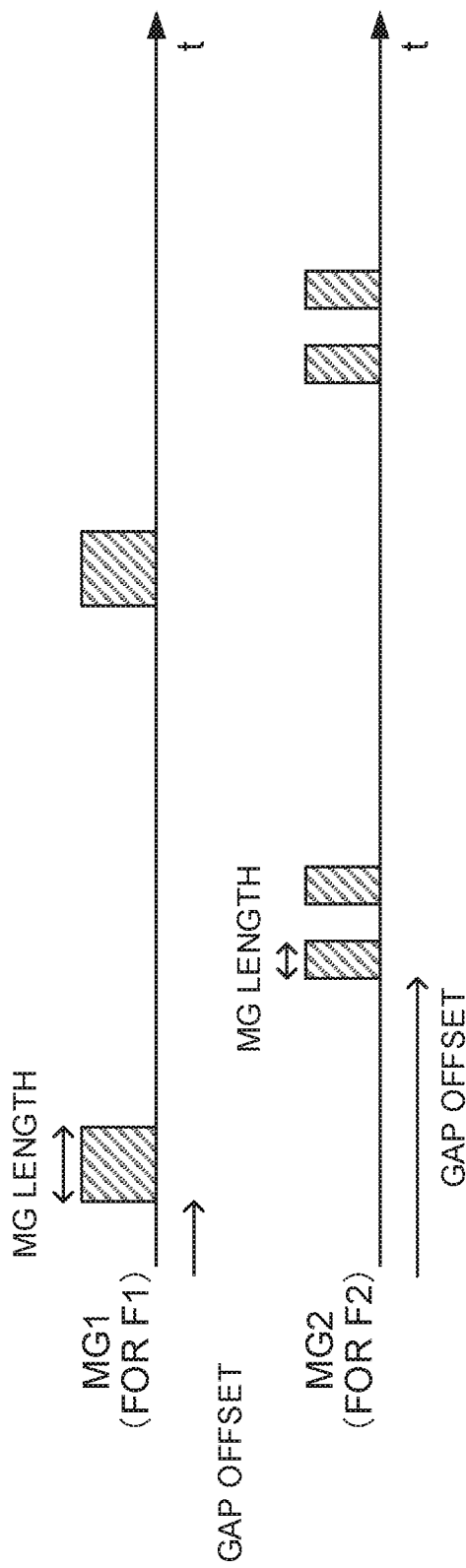
FIG. 12 is a diagram to show examples of MG patterns per frequency band and non-contiguous-MG patterns.

FIG. 12 is a diagram to show examples of MG patterns per frequency band and non-contiguous-MG patterns. The NW applies different MG configurations MG 1 and MG 2 to 2 frequency bands F1 and F2 for 1 UE. In this example, in frequency band F1, an MG configuration MG 1 having an MG pattern is configured, and in frequency band F2, an MG configuration MG 2 having a non-contiguous MG pattern is configured. The period of the MG pattern (MGRP) of MG configuration MG 1, and the period of the non-contiguous MG pattern (the MGRP in the first configuration method, or the sub-MG period in the second configuration method) of MG configuration MG 2 are the same. The gap (MG or sub-MG) lengths and offsets are different between MG configuration MG 1 and MG 2.

By providing MG configurations per frequency band, the overhead of signaling can be reduced compared to the case where MG configurations are provided per frequency. Also, the overhead of signaling can be reduced by making some of the MG parameters common in multiple MG configurations. Also, even when the SS block pattern varies per frequency band, different MG configurations can be used for each frequency band.

Eighth Embodiment

According to an eighth embodiment of the present invention, in an asynchronous network, an MG pattern to have 1 MG in 1 MGRP (single-MG pattern), as in existing LTE, and MG parameters that are suitable for SS burst sets are configured.

MGL, for example, is the SS burst set period P+X. P and/or X may be determined by UE based on parameters such as SCS, may be reported from the NW, or may be determined based on the specification. The MGL may be determined by UE based on parameters such as P and/or X, may be reported from the NW, or may be determined based on the specification.

MGRP may be an integral (k, where k=1, 2, 3 . . . ) multiple of SS burst set period P (20 ms)—that is, k×P [ms]. The gap offset is, for example, a smaller value than the MGRP, and may be integer value (0 to k×P−1) [ms].

Figure 13:
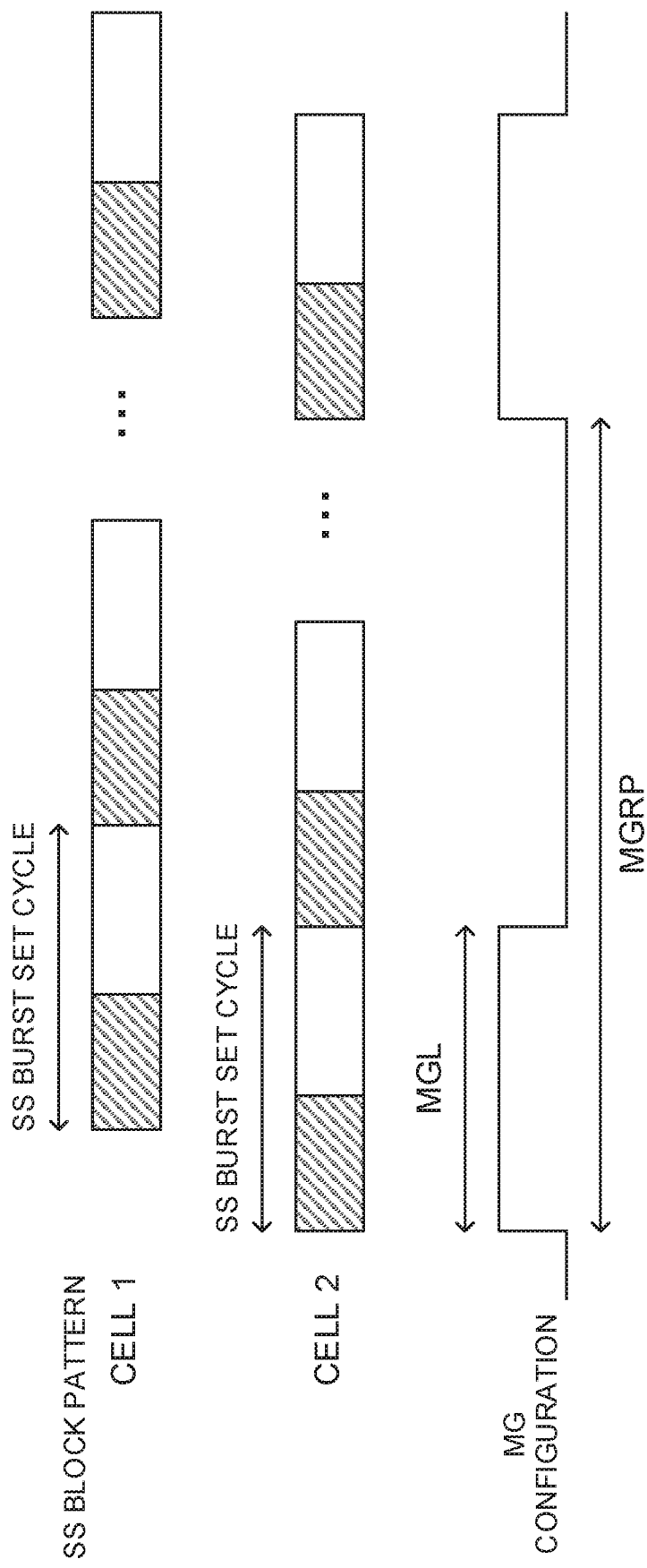
FIG. 13 is a diagram to show examples of MG configurations according to an eighth embodiment of the present invention.

FIG. 13 is a diagram to show an example of MG configuration according to the eighth embodiment. This drawing shows an SS block pattern and an MG configuration. Here, the SS block patterns of cells 1 and 2 are comprised of localized SS blocks. Note that the present embodiment can also be applied to localized SS blocks.

The timing of transmitting the SS burst set differs between cell 1 and cell 2. The MGL is greater than or equal to the SS burst set period, which allows 1 MG to cover all SS blocks in the SS burst sets of all cells.

The UE can measure all the SS blocks in an SS burst set by measuring 1 MG. Note that the UE does not have to measure all the SS burst sets, and may measure 1 SS burst set for every k contiguous SS burst sets.

Since 1 MG is configured in an MGRP, the UE can reduce the number of times to switch frequency. When the interval of localized SS blocks is longer, the time communication is interrupted also becomes longer, so that the present embodiment is suitable when the interval of localized SS blocks is short.

Ninth Embodiment

With a ninth embodiment of the present invention, an MG pattern (non-contiguous MG pattern), in which multiple non-contiguous gaps (sub-MG events or sub-MGs) are provided in 1 period of the MG pattern, is configured as an MG configuration that is suitable for SS burst sets.

Now, 2 methods of configuring non-contiguous MG patterns will be described below. The first configuration method provides 1 MG configuration that includes multiple sub-MG events. The second configuration method provides a plurality of MG configurations, each showing sub-MGs.

The number of SS burst sets in 1 non-contiguous MG pattern's period is k (k=1, 2 . . . ), and the number of SS bursts in 1 SS burst set is n (n=2, 3 . . . ).

Figure 14:
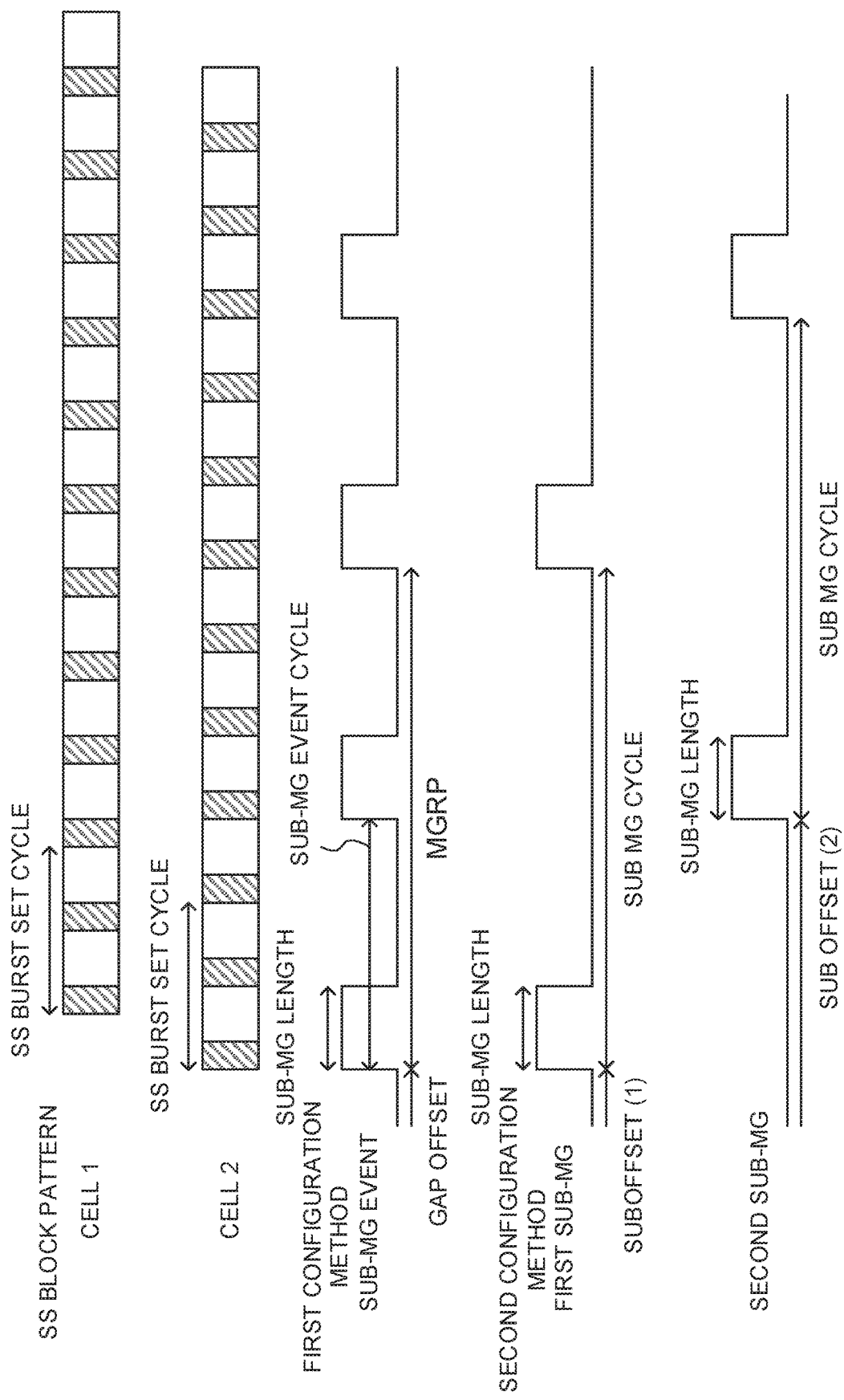
FIG. 14 is a diagram to show examples of non-contiguous MG patterns according to a ninth embodiment of the present invention.

FIG. 14 is a diagram to show examples of non-contiguous MG patterns according to the ninth embodiment. Here, k=1 and n=2. This drawing shows SS block patterns for cells 1 and 2, sub-MG events configured based on the first configuration method, and multiple sub-MGs (first sub-MG, second sub-MG, etc.) configured based on the second configuration method. Here, the SS block patterns of cells 1 and 2 are comprised of distributed SS blocks. Note that the present embodiment can also be applied to localized SS blocks.

In the first configuration method, the NW configures n sub-MG events in 1 MGRP, in UE, via RRC signaling. An MG configuration is represented by, for example, MGRP, gap offset, sub-MG length, sub-MG event period and so on.

The MGRP, the sub-MG event period and the number of sub-MG events may be determined as in the first configuration method of the third embodiment if an SS block pattern is comprised of localized SS blocks, or may be determined in the same way as in the first configuration method of the fifth embodiment or the sixth embodiment if an SS block pattern is comprised of distributed SS blocks. The gap offset, for example, is a smaller value than MGRP.

The sub-MG length is determined on the condition that, for example, the duration of all sub-MG events combined covers the SS burst set.

If an SS block pattern is comprised of distributed SS blocks, the sub-MG length is, for example, 1/n×P, MGRP is, for example, (n+1) k×P, and the sub-MG event period is, for example, 1/n×P+k×P.

In the first configuration method shown in FIG. 14, k=1 and n=2 hold, so that 1 SS burst set includes 2 SS bursts (first SS burst and second SS burst), MGRP is 3×P, the sub-MG length is ½×P, and the sub-MG event period is ½×P+P=3/2×P.

By this means, 2 sub-MG events (first sub-MG event and second sub-MG event) are configured in 3 SS burst sets (first SS burst set, second SS burst set and third SS burst set) in 1 MGRP.

Provided that the sub-MG event period is 3/2 times the SS burst set period P, the first sub-MG event covers half of the duration of an SS burst set, and the second sub-MG event covers the other half of the duration of the SS burst set, thereby covering the whole duration of an SS burst set with all sub-MG events.

The UE can measure all the SS blocks in multiple SS burst sets by measuring all the sub-MG events in 1 MGRP. In this case, the UE may report the result of comparing the measurement results of all sub-MG events in 1 MGRP.

In the second configuration method, the NW configures n sub-MGs with varying sub-offsets, in the UE, via RRC signaling. The MG configuration is represented by, for example, a sub-MG length, a sub-MG period and n sub-offsets. In n sub-MGs, the sub-MG length and the sub-MG period are common.

The sub-MG period, sub-MG length, multiple sub-offsets and the number of sub-MGs may be determined as in the second configuration method of the third embodiment if an SS block pattern is comprised of localized SS blocks, or may be determined in the same way as in the second configuration method of the fifth embodiment or the sixth embodiment if an SS block pattern is comprised of distributed SS blocks.

The sub-MG length is determined on the condition that, for example, the duration of all sub-MG combined covers an SS burst set.

If an SS block pattern is comprised of distributed SS blocks, the sub-MG length is, for example, 1/n P, the sub-MG event period is, for example, (n+1)×k×P. Also, where multiple sub-offsets correspond to multiple sub-MGs, respectively, the i-th sub-offset is, for example, sub-offset (i)=sub-offset (i−1)+1/n×P+k×P.

In the second configuration method shown in FIG. 14, k=1 and n=2 hold, so that 1 SS burst set includes 2 SS bursts (first SS burst and second SS burst), the sub-MG period is 3×P and the sub-MG length is ½×P.

Consequently, 2 sub-MGs (first sub-MG and second sub-MG) are configured in 3 SS burst sets (first SS burst set, second SS burst set and third SS burst set) in 1 MGRP.

Provided that sub-offset (2)−sub-offset (1) is 3/2 times the SS burst set period P, the first sub-MG covers half of the duration of an SS burst set, and the second sub-MG covers the other half of the duration of the SS burst set, thereby covering the whole duration of the SS burst set with all sub-MGs. By this means, the same non-contiguous MG pattern is configured as in the first configuration method.

When the UE measures the sub-MGs, the UE can measure all the SS blocks in an SS burst set by switching from 1 sub-MG to another and measuring every sub-MG once. In this case, the UE may report the result of comparing the measurement results of all sub-MGs.

According to the present embodiment, the length of 1 gap (sub-MG event or sub-MG) can be made short compared to the eighth embodiment. Consequently, even when the connecting frequency is disconnected, the resulting impact of delay in communication can still be reduced. Also, the present embodiment can configure gaps that are shorter than the SS burst set period, and therefore is suitable when the SS burst set period is long.

Meanwhile, with the present embodiment, the frequency is switched more frequently than the eighth embodiment, so that, in the eighth embodiment, the UE operation can be simplified compared to the present embodiment.

(Others)

The RRM measurement operation of UE in different MG configurations may be defined in the specification.

For example, when a single-MG pattern is used (second, fourth and eighth embodiments), UE can monitor RRM reference signals from all beams of 1 cell, so that the UE can conduct cell identification and RRM measurements within an MG period.

For example, when a non-contiguous MG pattern is used (third, fifth, sixth and ninth embodiments), the UE can monitor only part of the RRM reference signals from each gap (sub-MG event or sub-MG). In this way, the UE may perform cell identification and RRM measurements by taking into account or combining all of the multiple gaps in the non-contiguous MG pattern. By this means, different SS blocks transmitted in different beams can be detected and/or measured.

For example, the UE may compare the SS block RSRPs (beam-specific) of all the gaps, select a predetermined number of beam level RRM results from the top, and derive a cell-level measurement results.

The NW may configure 2 types of UE RRM operations (single-MG pattern and non-contiguous MG pattern) for each MG configuration, in the UE, by way of RRC signaling.

NR may support one or more MG configurations, and the base station may apply an MG configuration to measurement on 1 frequency by 1 UE by way of RRC signaling. The base station may configure 2 types of UE operations—namely, UE operation for a single-MG pattern and UE operation for a non-contiguous MG pattern—and switch between them. The base station may configure 2 types of UE operations—namely, UE operation for localized SS blocks and UE operation for distributed SS blocks. The MG configuration may be the same for all frequencies, or may be the same within frequencies, frequency bands, frequency ranges, and/or frequency groups.

other parameters may be included in MG configurations, or may be associated with MG configurations. The parameters may include information to indicate the frequency or the frequency band in which the MG configurations are used. Also, the parameters may include information indicating SCS or numerology. To provide this information, default values may be preconfigured for each frequency. The parameters may also include the measurement bandwidth. To provide this information, default values may be preconfigured for each frequency. Also, the parameters may be information on an RRM measurement operation by the UE.

In non-contiguous MG patterns, the spacing between MGs may not be fixed. Non-contiguous MG patterns repeat in MGRP or sub-MG periods.

The MG parameters (including at least one of MGL and MGRP) of the single-MG pattern may be defined as MG pattern information. The parameters of the first configuration method (at least one of the MGRP, the sub-MG length and the sub-MG event period) may be defined as MG pattern information. The MG parameters of the second configuration method (at least one of the sub-MG length, the sub-MG period and multiple sub-offsets) may be defined as MG pattern information. The NW may report an indicator of MG pattern information to the UE by way of RRC signaling. The UE may identify MG pattern information based on the reported indicator.

The UE may identify, based on parameters related to numerology and/or SS blocks, at least one of MG parameters, the parameters of the first configuration method, and the parameters of the second configuration method. The UE may switch between MG patterns and RRM measurement operations depending on parameters reported.

The period of an MG pattern (for example, a single-MG pattern or a non-contiguous MG pattern) (for example, MGRP or sub-MG period) is an integer multiple of the period (for example, SS burst set period) of the synchronization signal block pattern (for example, localized SS blocs or distributed SS blocks), the duration of at least 1 gap (for example, MG, sub-MG event, sub-MG, etc.) in the MG pattern covers the duration of the plurality of synchronization signal blocks and all SS blocks can be measured in 1 period of the MG pattern.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 15:
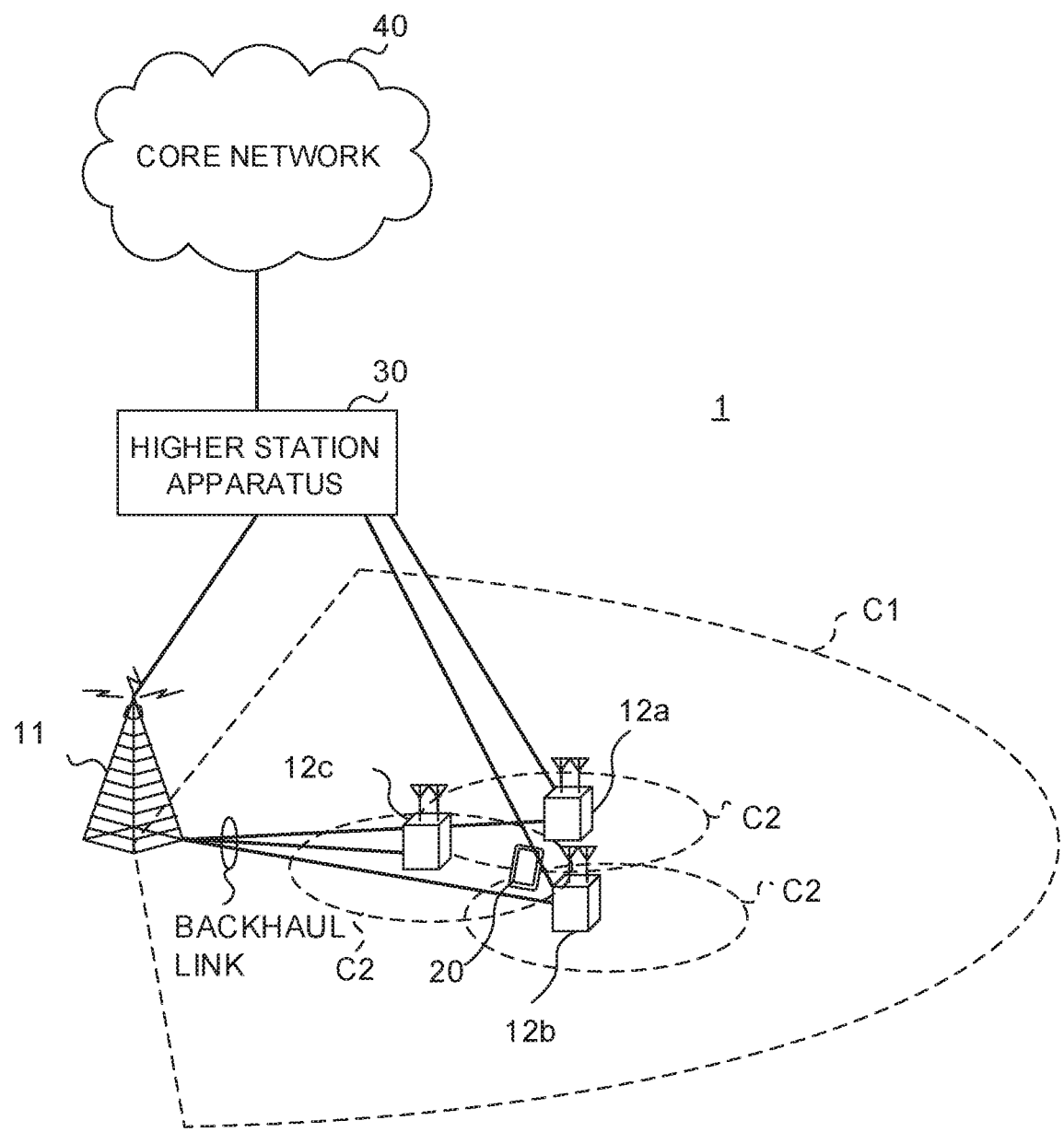
FIG. 15 is a diagram to show an exemplary schematic structure of a radio communication system according to one embodiment of the present invention.

FIG. 15 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency bandwidth (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 16:
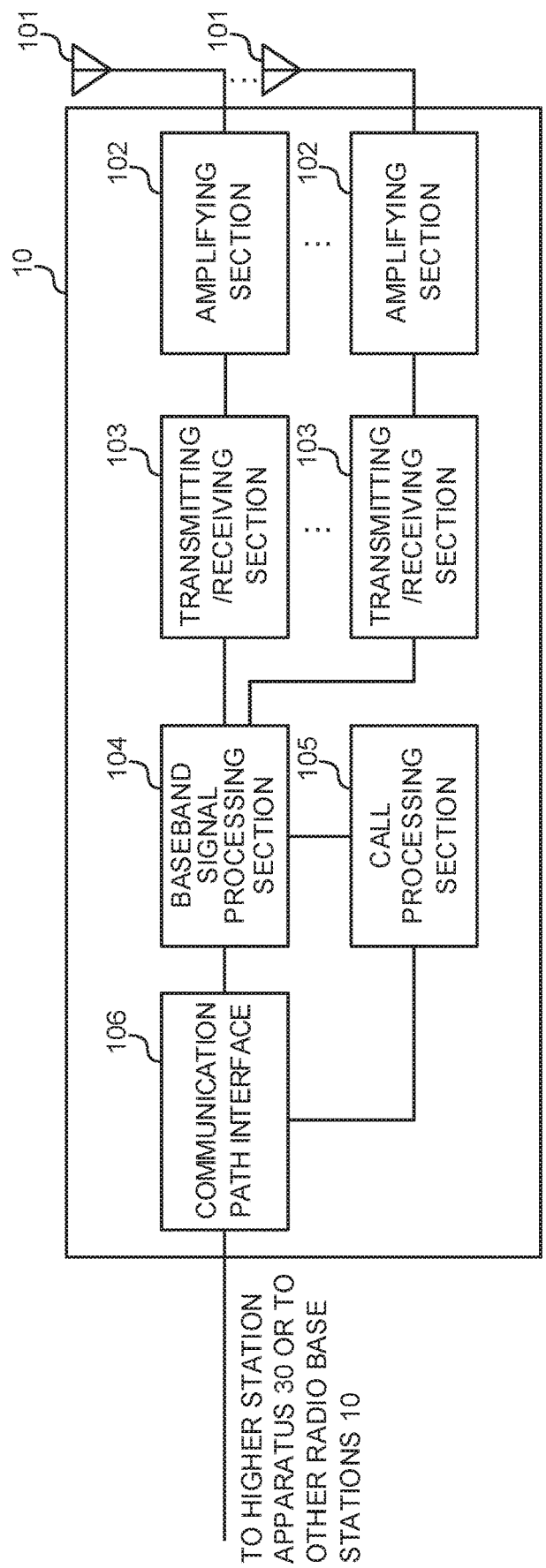
FIG. 16 is a diagram to show an exemplary overall structure of a radio base station according to one embodiment of the present invention.

FIG. 16 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 may transmit, to the user terminal 20, information about the measurement gap pattern (for example, single-MG pattern or non-contiguous MG pattern) to use when measuring a plurality of synchronization signal blocks (for example, SS blocks in an SS burst set). Also, the transmitting/receiving sections 103 may transmit synchronization signal blocks (for example, SS blocks) based on a synchronization signal block pattern that is comprised of a plurality of synchronization signal blocks (for example, SS burst set, localized SS block, distributed SS block etc.).

The transmitting/receiving sections 103 of each of a plurality of cells (for example, an asynchronous network) may transmit synchronization signal blocks asynchronously with respect to each other.

Also, the transmitting/receiving sections 103 may transmit information about measurement gap patterns that have varying measurement gap lengths and/or gap offsets, with respect to a plurality of frequencies.

Figure 17:
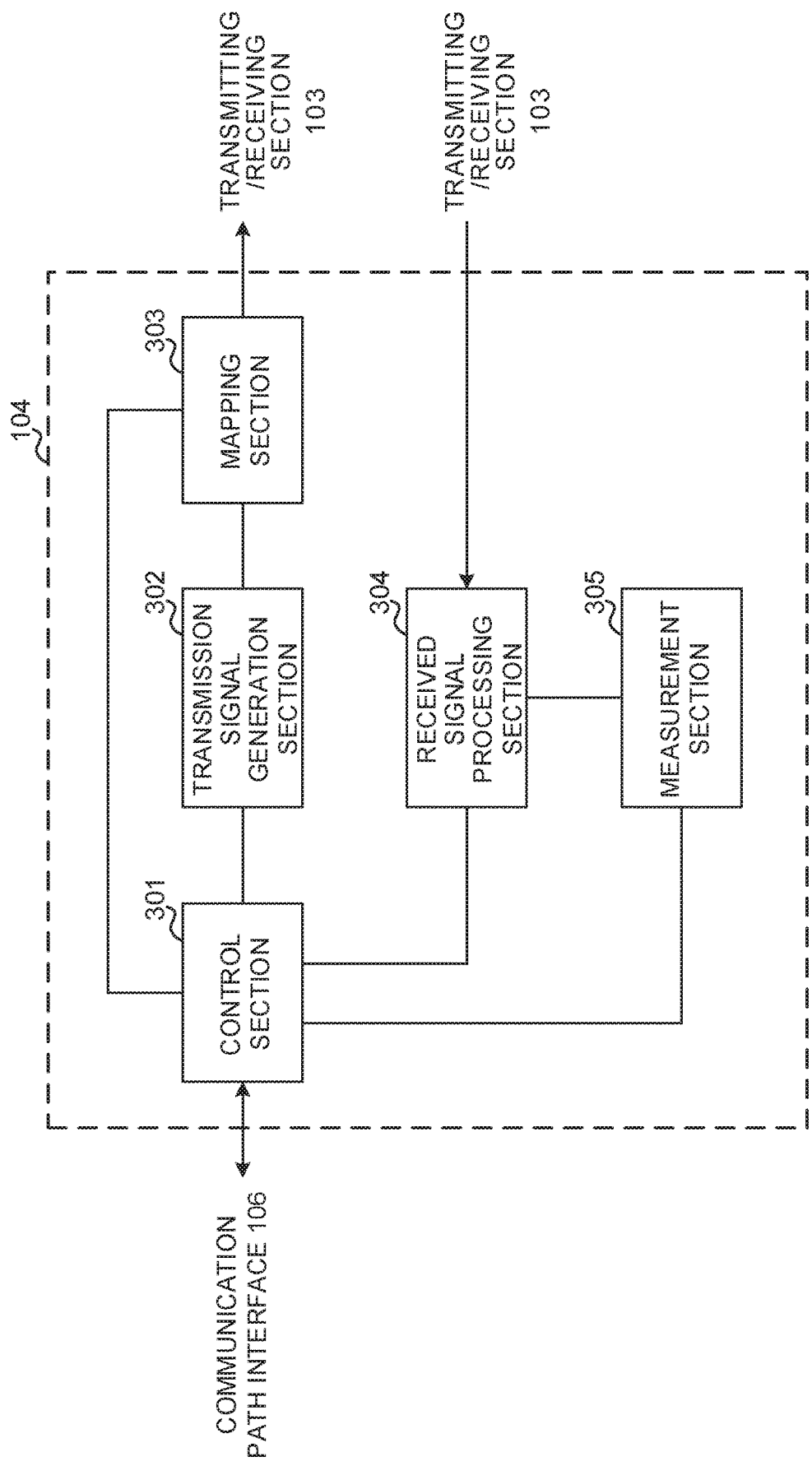
FIG. 17 is a diagram to show an exemplary functional structure of a radio base station according to one embodiment of the present invention.

FIG. 17 is a diagram to show an exemplary functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls scheduling such as uplink data signal (for example, signal transmitted on PUSCH, uplink control signals (for example, signals transmitted on PUCCH and/or PUSCH, including delivery acknowledgment information of delivery dependency, etc.), random access preamble (for example, a signal transmitted on PRACH) and uplink reference signal.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality). SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the control section 301 may generate information about the measurement gap patterns to use when measuring a plurality of synchronization signal blocks.

(User Terminal)

Figure 18:
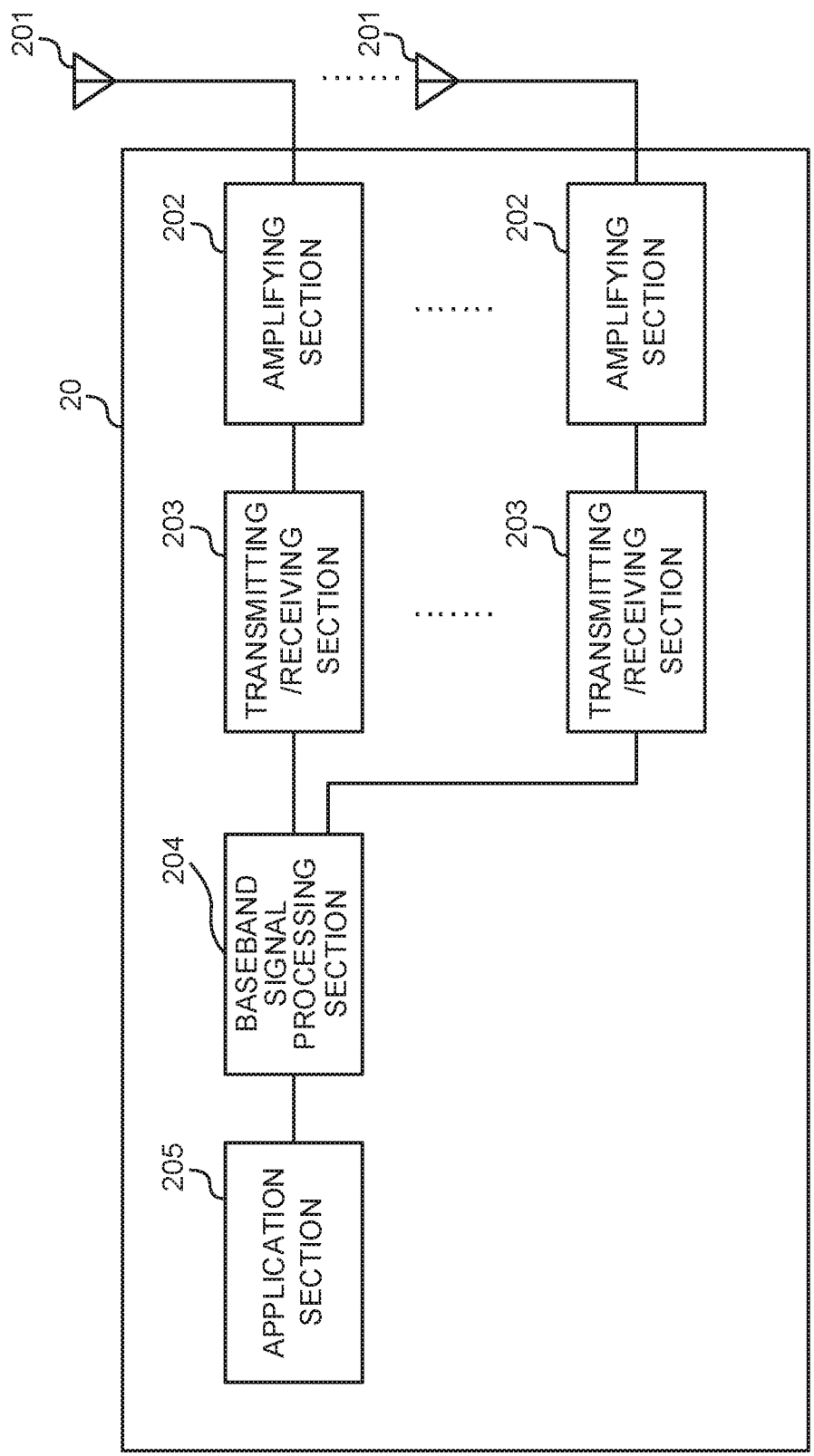
FIG. 18 is a diagram to show an exemplary overall structure of a user terminal according to one embodiment of the present invention.

FIG. 18 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive information about the measurement gap patterns to use when measuring multiple synchronization signal blocks. Also, the transmitting/receiving section 203 may receive synchronization signal blocks in measurement gaps.

Also, the transmitting/receiving sections 203 may receive information about measurement gap patterns having varying measurement gap lengths and/or gap offsets, for multiple frequencies (for example, carriers, frequency bands, frequency ranges, frequency groups).

Figure 19:
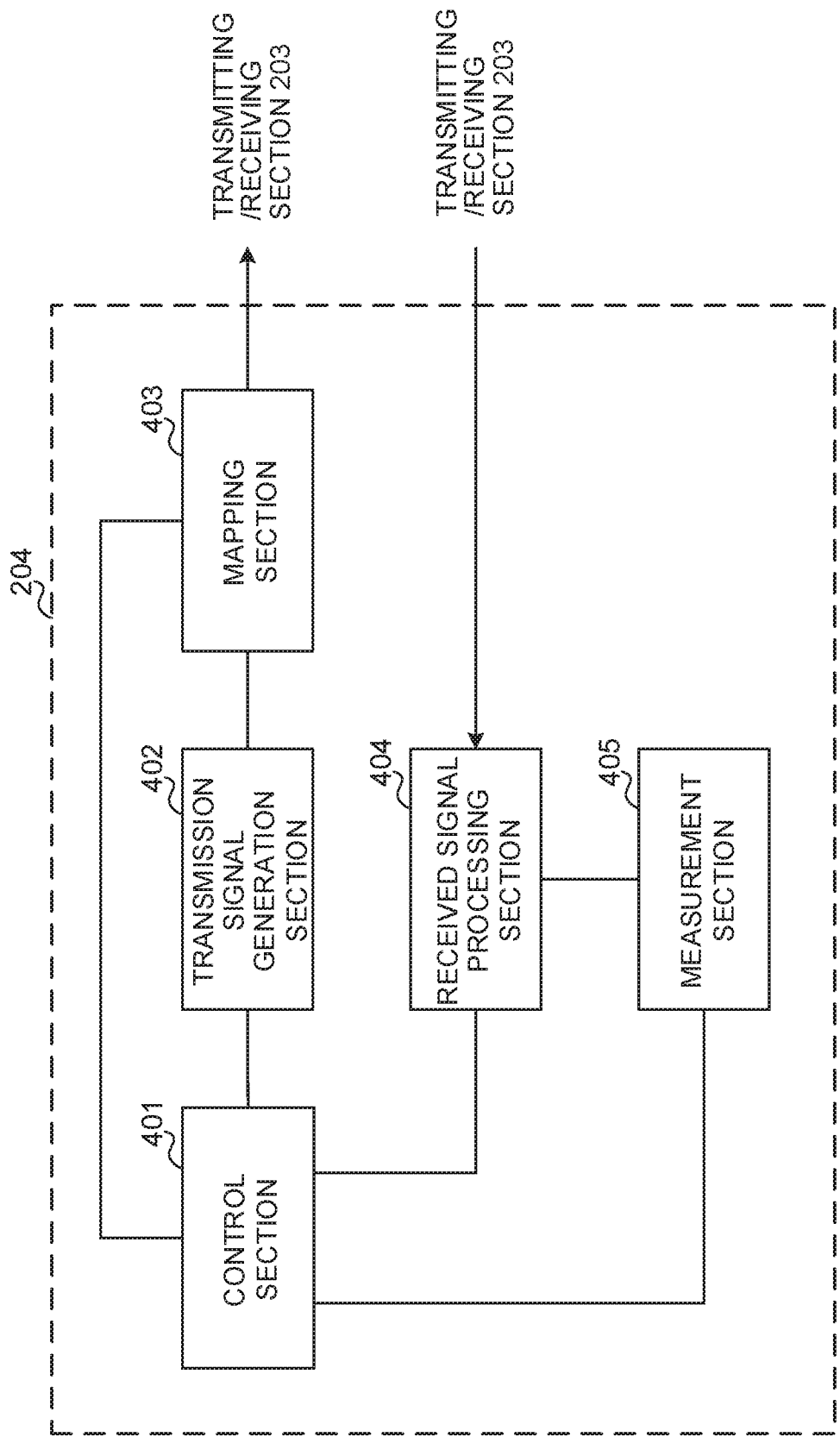
FIG. 19 is a diagram to show an exemplary functional structure of a user terminal according to one embodiment of the present invention.

FIG. 19 is a diagram to show an exemplary functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Also, the measurement section 405 may measure synchronization signal blocks in measurement gaps.

Also, the control section 401 may control the transmitting/receiving sections 203 to switch the frequency for the transmitting/receiving sections 203 based on information about the measurement gap patterns. The period of the measurement gap pattern may be an integral multiple of the period of the synchronization signal block pattern that is comprised of the plurality of synchronization signal blocks. The duration of the at least 1 measurement gap in the measurement gap pattern (for example, MG, sub-MG event, sub-MG, etc.) may cover the durations of a plurality of synchronization signal blocks.

The measurement gap pattern may be comprised of a plurality of measurement gaps. The duration of each measurement gap may cover the durations of different synchronization signal blocks among the plurality of synchronization signal blocks. Also, the measurement section 405 may measure multiple measurement gaps.

The plurality of synchronization signal blocks may be transmitted asynchronously from each of the plurality of cells. The duration of at least 1 measurement gap of the measurement gap pattern may cover the whole duration of the synchronization signal block pattern.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 20:
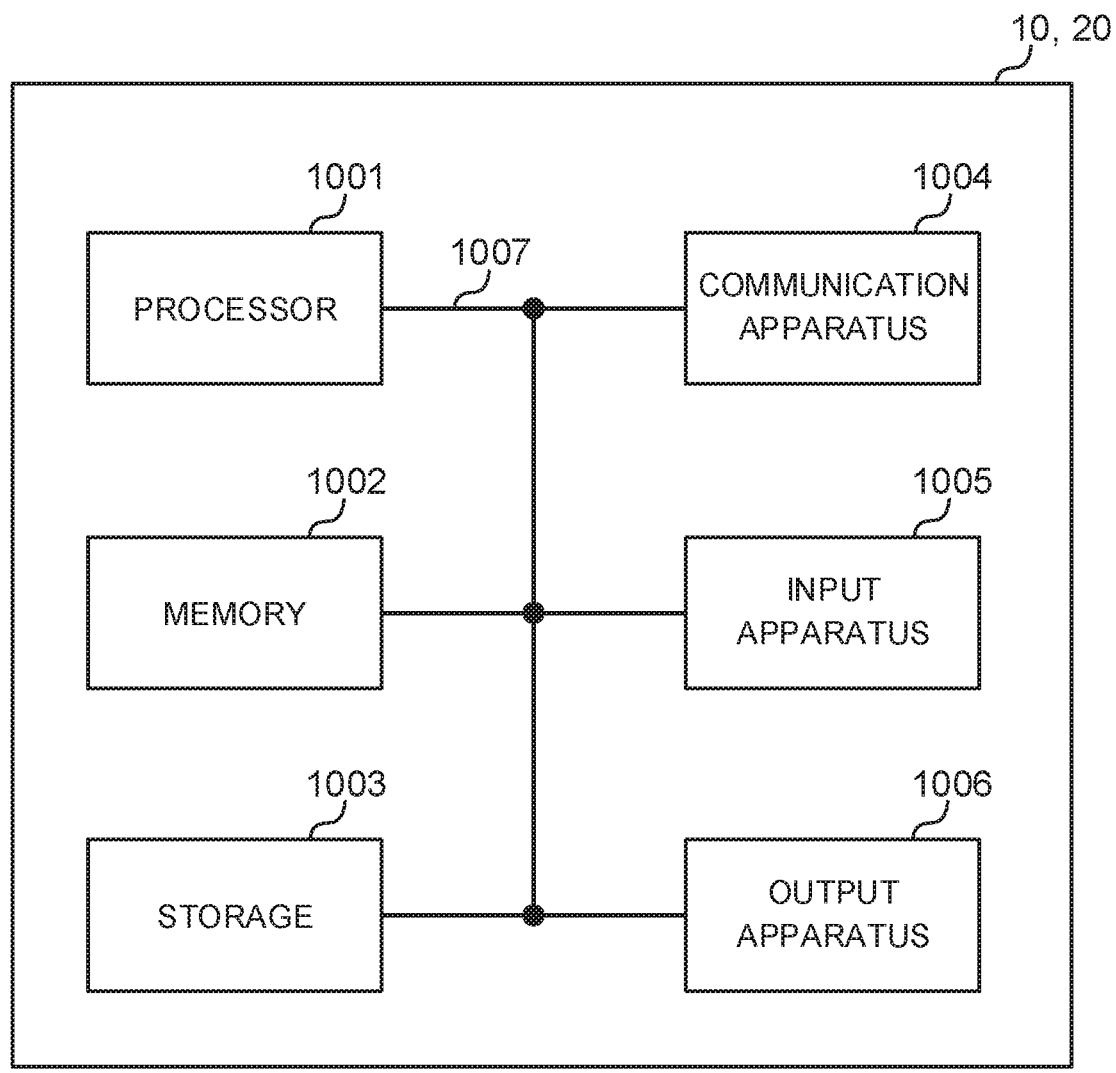
FIG. 20 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 20 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of contiguous subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of contiguous subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiving section that receives, by RRC signaling, at least one different measurement gap configuration per frequency range; and
   a control section that applies the received measurement gap configuration for measurement in the frequency range,
   wherein the frequency ranges comprise two frequency ranges and the measurement gap configurations comprise two measurement gap configurations, and
   wherein the measurement gap periods respectively included in the measurement gap configurations are the same.

2. The terminal according to claim 1, wherein a measurement gap period included in the measurement gap configuration corresponds to a synchronization signal block period.

3. A radio communication method comprising:
   receiving, by RRC signaling, at least one different measurement gap configuration per frequency range; and
   applying the received measurement gap configuration for measurement in the frequency range,
   wherein the frequency ranges comprise two frequency ranges and the measurement gap configurations comprise two measurement gap configurations, and
   wherein the measurement gap periods respectively included in the measurement gap configurations are the same.

4. A radio communication system comprising a base station and a terminal, wherein:
   the base station comprises:
      a transmitting section that transmits, by RRC signaling, at least one different measurement gap configuration per frequency range; and
   the terminal comprises:
      a receiving section that receives the at least one different measurement gap configuration per frequency range; and
      a control section that applies the received measurement gap configuration for measurement in the frequency range,
      wherein the frequency ranges comprise two frequency ranges and the measurement gap configurations comprise two measurement gap configurations, and wherein the measurement gap periods respectively included in the measurement gap configurations are the same.

* * * * *